United States Patent
Gilligan

(10) Patent No.: US 7,441,061 B2
(45) Date of Patent: Oct. 21, 2008

(54) METHOD AND APPARATUS FOR INTER-MODULE COMMUNICATIONS OF AN OPTICAL NETWORK ELEMENT

(75) Inventor: Douglas A. Gilligan, Newark, CA (US)

(73) Assignee: Dynamic Method Enterprises Limited, Hong Kong (HK)

( * ) Notice: Subject to any disclaimer, the term of this patent is extended or adjusted under 35 U.S.C. 154(b) by 86 days.

(21) Appl. No.: 11/356,545

(22) Filed: Feb. 16, 2006

(65) Prior Publication Data

US 2006/0193631 A1 Aug. 31, 2006

Related U.S. Application Data

(60) Provisional application No. 60/656,769, filed on Feb. 25, 2005.

(51) Int. Cl.
G06F 13/00 (2006.01)

(52) U.S. Cl. .......................... 710/300; 398/58; 370/254

(58) Field of Classification Search ................. 710/100, 710/300–302, 305, 313; 709/200, 206, 213; 711/100, 148, 146; 359/107; 398/58, 60, 398/45; 370/254, 257
See application file for complete search history.

(56) References Cited

U.S. PATENT DOCUMENTS

| | | | |
|---|---|---|---|
| 4,430,699 A | | 2/1984 | Segarra et al. |
| 5,172,259 A | | 12/1992 | Cloonan et al. |
| 6,038,228 A | * | 3/2000 | Pullen et al. ................ 370/384 |
| 6,370,154 B1 | * | 4/2002 | Wickham ................... 370/463 |
| 6,393,481 B1 | * | 5/2002 | Deo et al. .................... 709/224 |
| 7,013,335 B2 | * | 3/2006 | Barnhouse et al. .......... 709/223 |
| 7,092,690 B2 | * | 8/2006 | Zancewicz ................... 455/273 |
| 2002/0053062 A1 | * | 5/2002 | Szymanski .................. 714/801 |
| 2002/0176131 A1 | | 11/2002 | Walters et al. |
| 2003/0076857 A1 | * | 4/2003 | Morita et al. ................ 370/466 |
| 2004/0033075 A1 | | 2/2004 | Koch et al. |
| 2005/0213557 A1 | * | 9/2005 | Hwang et al. ................ 370/351 |
| 2006/0075042 A1 | * | 4/2006 | Wang et al. .................. 709/206 |
| 2006/0193631 A1 | * | 8/2006 | Gilligan ....................... 398/58 |
| 2006/0203716 A1 | * | 9/2006 | Gilligan ....................... 370/216 |

OTHER PUBLICATIONS

"An optical packet switch based on WDM technologies" by Choa et al. (abstract only) Publication Date: Mar. 2005.*
Written Opinion, PCT/US06/06633 mailed Jul. 10, 2007.
PCT Search Report, PCT/US06/06633 mailed Jul. 10, 2007.

* cited by examiner

*Primary Examiner*—Glenn A Auve
(74) *Attorney, Agent, or Firm*—Blakely, Sokoloff, Taylor & Zafman LLP.

(57) ABSTRACT

Inter-module communications of an optical network element are described herein. In one embodiment, an exemplary optical network element includes multiple functional modules arranged in multiple shelves and multiple management modules for coordinating the functional modules. Each of the management modules corresponds to each of the shelves respectively. Each of the management modules includes a memory having multiple memory regions, where each memory region corresponds to each of the functional modules of a respective shelf to allow each of the functional modules of the respective shelf to communicate with the management module by accessing a respective memory region. Other methods and apparatuses are also described.

20 Claims, 15 Drawing Sheets

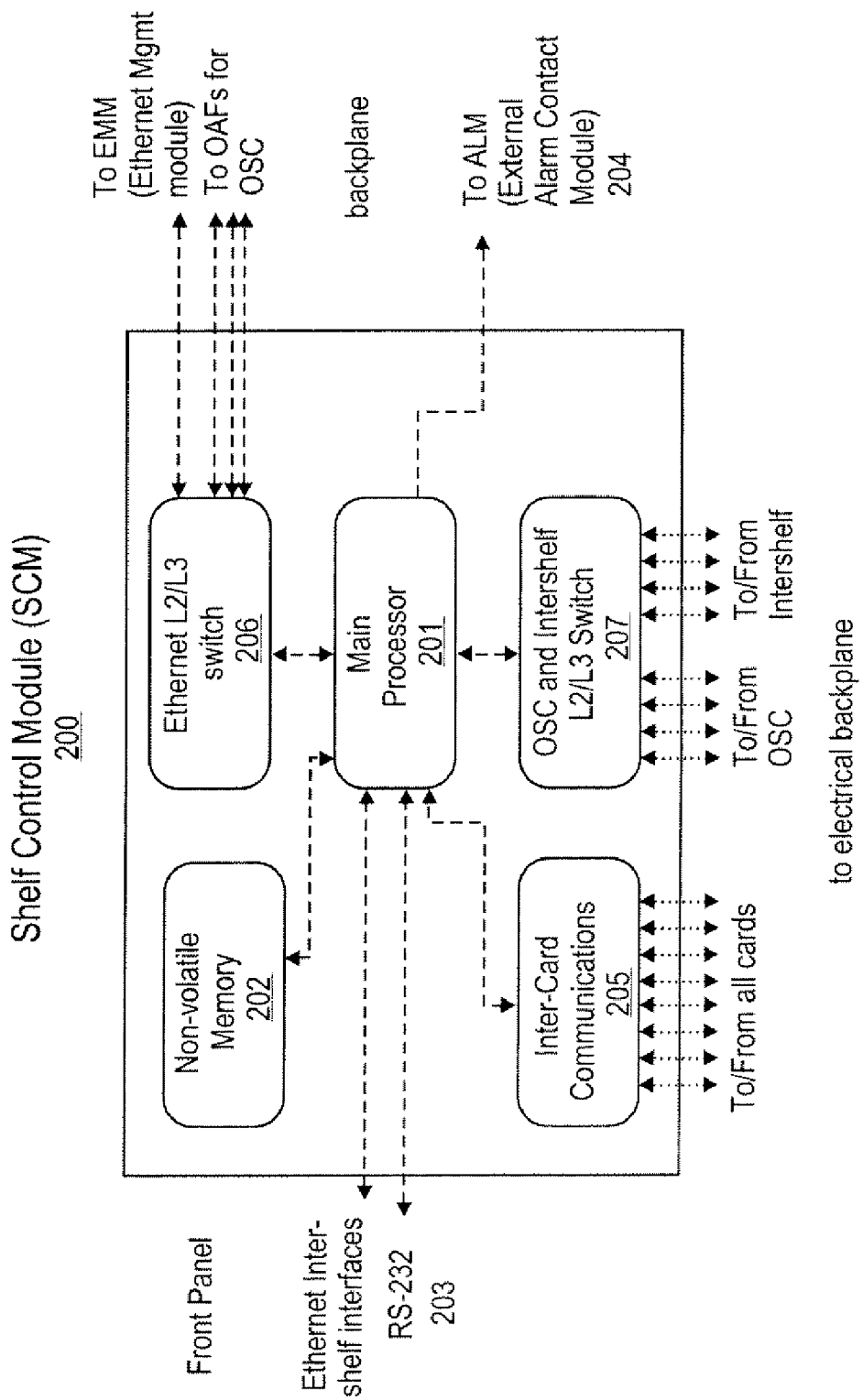

METHOD AND APPARATUS FOR INTER-MODULE COMMUNICATIONS OF AN OPTICAL NETWORK ELEMENT

RELATED APPLICATIONS

This application claims the priority of U. S. Provisional Application No. 60/656,769, entitled "Inter-Module Communications of an Optical Network Element", filed Feb. 25, 2005, which is incorporated by reference herein in its entirety.

FIELD OF THE INVENTION

The present invention relates generally to the field of networking. More particularly, this invention relates to inter-module communications of an optical network element.

BACKGROUND OF THE INVENTION

An optical network is a collection of optical network devices interconnected by links made up of optical fibers. Thus, an optical network is a network in which the physical layer technology is fiber-optic cable. Cable trunks are interconnected with optical cross-connects (OXCs), and signals are added and dropped at optical add/drop multiplexers (OADMs). The optical network devices that allow traffic to enter and/or exit the optical network are referred to as optical network elements; in contrast, any optical network devices that do not are referred to as pass-thru nodes (an optical network need not have any pass-thru nodes). Each optical link interconnects two optical network devices and typically includes an optical fiber to carry traffic in both directions. There may be multiple optical links between two optical network devices.

A given fiber can carry multiple communication channels simultaneously through a technique called wavelength division multiplexing (WDM), which is a form of frequency division multiplexing (FDM). When implementing WDM, each of multiple carrier wavelengths (or, equivalently, frequencies or colors) is used to provide a communication channel. Thus, a single fiber looks like multiple virtual fibers, with each virtual fiber carrying a different data stream. Each of these data streams may be a single data stream, or may be a time division multiplex (TDM) data stream. Each of the wavelengths used for these channels is often referred to as a lambda.

Typically, an optical network device includes multiple component modules which may be arranged in one or more shelves. One conventional approach to implement inter-module communications is to maintain a dedicated processor within each module to handle the inter-module communications. However, this results in more software overhead to process the packets, more cost and power consumption, and more components. Another approach is to invoking a bus technology, such as PCI, to support the inter-module communications. However, this approach requires larger connectors and components. It may also require special pins per slot to accommodate control of back-end power and module presence.

In addition, the inter-module communications may further require run-time verification of the packets transmitted. Typical error detections include parity checking, checksum, ECC (error correction codes), and redundant circuit operations. Parity determines whether a word of data is odd or even in terms of number of "1" bits. Parity generator then sets the parity bit to make the total of all bits (including the parity bit) always odd or even depending on the algorithms used. The receiver of the data performs the similar algorithm (including the parity bit) and indicates an error if it does not come out to be the value expected.

Checksum and SHA use more complex algorithm on larger packets and then write the resultant bytes of data at the end of the packet. The receiver of the data performs the similar algorithm (not including the checksum) and indicates an error if it does not come out of the same value as received. ECC uses a very complex algorithm to generate bits sent with the data. The receiver of the data performs the similar algorithm (including the ECC bits) and indicates an error if it does not come out to be the value expected, but is also able to make use of the ECC bits to correct at least one incorrect bit. Redundant circuits use the deceptively simple technique of having multiple identical circuits performing the same task with an additional "voting" circuit to determine if one of the circuits disagrees with the others.

Although the above methods can produce similar results, however, these methods are either complicated and require relatively higher cost to implement, or alternatively less complete to provide reliable error detections.

SUMMARY OF THE INVENTION

Inter-module communications of an optical network element are described herein. In one embodiment, an exemplary optical network element includes multiple functional modules arranged in multiple shelves and multiple management modules for coordinating the functional modules. Each of the management modules corresponds to each of the shelves respectively. Each of the management modules includes a memory having multiple memory regions, where each memory region corresponds to each of the functional modules of a respective shelf to allow each of the functional modules of the respective shelf to communicate with the management module by accessing a respective memory region. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 2 is a block diagram illustrating an exemplary management module of an optical network element, according to one embodiment.

DETAILED DESCRIPTION

Figure 1A:
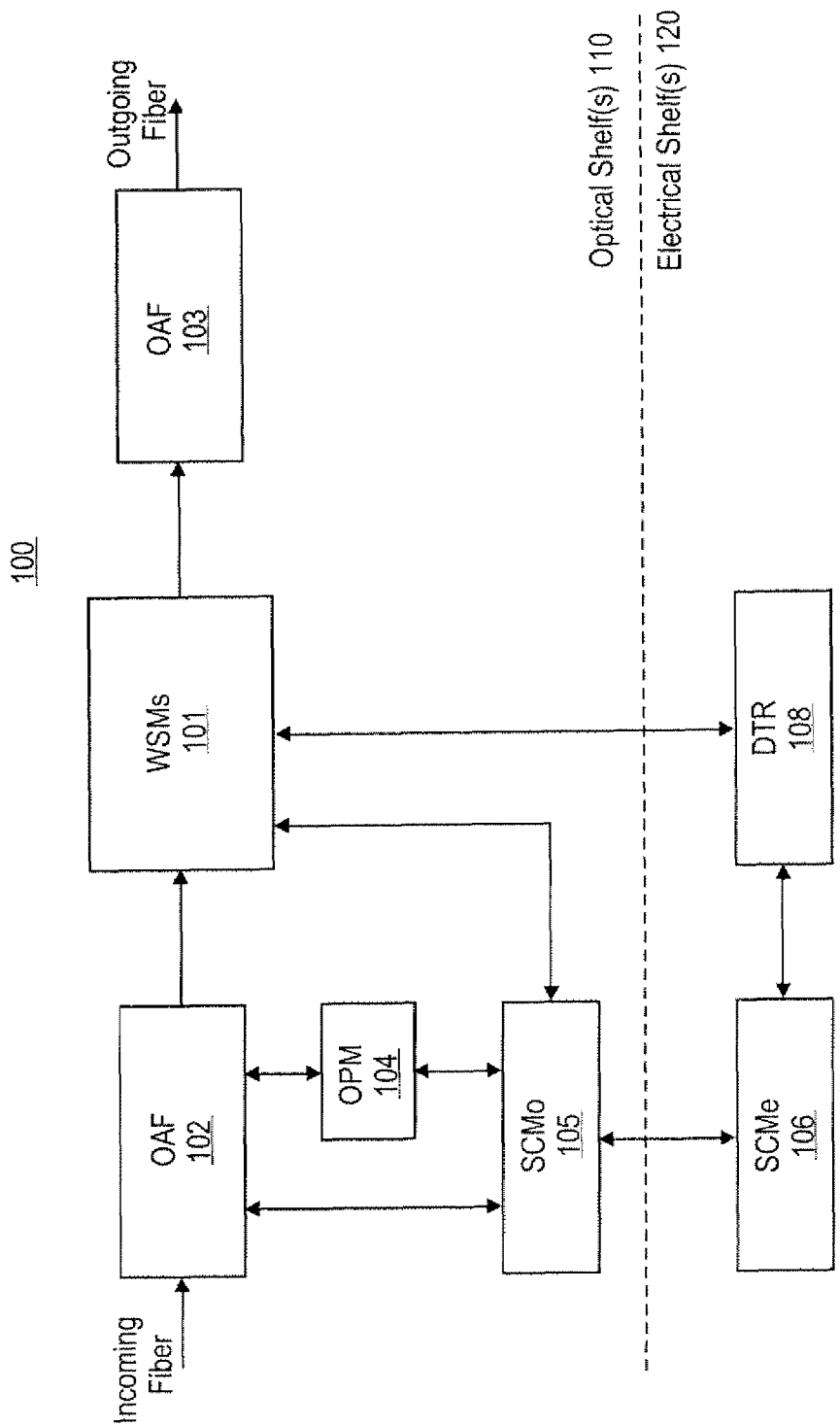
FIGS. 1A and 1B are block diagrams illustrating an exemplary optical network element according to certain embodiments of the invention.

Inter-module communications of an optical network element are described herein. According to one embodiment, a centralized management module is designed to allow one module with a processor to control substantially all of the other modules (without processors), such as, for example, OAF (optical amplifier and filtering) modules arranged in a relatively large chassis (also referred to as a shelf). As a result, software and/or hardware requirements are simplified in order to write to and retrieve data from any module. This flexible solution allows effectively a relatively large range of functions to be implemented on the modules. In addition, relatively low latency exists in communications between the modules. Such a design also supports high availability requirements.

In one embodiment, an active and inactive (e.g., backup) management modules are maintained for the purposes of redundancy. In one embodiment, each of the active and inactive management modules includes a dedicated interface to any other modules. A management module is able to control LEDs, resets, and back-end power on every module. The management module is also able to retrieve configuration information from a remote module (e.g., non-management module), such as, for example, temperature, module ID, and other status before powering up the respective module. In one embodiment, a remote module is able to send an interrupt to a management module. A remote module may also be able to update module's status on the management module or alternatively, a management module may request for a status update.

In addition, after a transmitting module transmits a first packet of data to a receiving module, the transmitting module may transmit a first value to the receiving module, where the first value represents a number of bits of the first packet having a predetermined logical value. When the receiving module receives the first value, it compares the first value with a second value representing a number of bits of the received first packet having the predetermined logical value, where the second value is counted by the receiving module. A result of the comparison may be used to determined whether the first packet has been transmitted and received successfully.

Further, the receiving module may send a second packet back to the transmitting module, where the second packet mirrors the first packet. When the transmitting module receives the second packet, it compares the second packet with a copy of the first packet maintained within the transmitting module to verify whether the first packet has been transmitted successfully.

Furthermore, a module may further include a transmitting error generator and/or a receiving error generator to deliberately generate an error on the transmitting path and/or the receiving path to test an error detection and recovery mechanisms of the transmitting and/or receiving paths. Such testing may be performed at runtime without substantially invoking external test equipment.

In the following description, numerous specific details are set forth (e.g., such as logic resource partitioning/sharing/duplication implementations, types and interrelationships of system components, and logic partitioning/integration choices). However, it is understood that embodiments of the invention may be practiced without these specific details. In other instances, well-known circuits, software instruction sequences, structures and techniques have not been shown in detail in order not to obscure the understanding of this description.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct contact with each other (e.g., physically, electrically, optically, etc.). "Coupled" may mean that two or more elements are in direct contact (physically, electrically, optically, etc.). However, "coupled" may also mean that two or more elements are not in direct contact with each other, but yet still co-operate or interact with each other.

Exemplary Inter-Module Communications

According to one embodiment, a centralized management module (also referred to as a local module or a processor module) is maintained for one or more functional modules (also referred to as remote modules, non-management modules, modules without a processor for the purposes of management functionality) arranged in a shelf. In one embodiment, each management module is maintained for each shelf (also referred to as a chassis). A management module is coupled to each of the functional via a dedicated channel, also referred to as supervisory communication channel (SCC). In one embodiment, a SCC may be implemented as a half-duplex point-to-point communication link.

In one embodiment, the functionality of a SCC may be implemented similar to a serialized PCI (point-to-point) interface using a write-only protocol and with application specific memories on the management module that a functional module can write to. In one embodiment, these memories include a status memory region, a read-reply memory region, and an interrupt memory region. The status memory region may be updated periodically by a functional module regarding status of the respective functional module. The read-reply memory region may be used for a functional module to send data to the management module in response to a request for such data received from the management module. The interrupt memory region may be used by a functional module to generate an interrupt to the management module by writing to one or more locations of the interrupt memory region.

In addition, according to one embodiment, a dedicated pin (also referred to as a presence pin) is maintained by a management module for each functional module it manages to indicate whether the respective functional module is inserted into a corresponding slot in the shelf. This may be configured (e.g., enabled or disabled) to result in an interrupt to the management module whenever a presence status of the slot changes (e.g., plugged or unplugged). Further, according to one embodiment, an SCC may be implemented sufficiently simplified to be run in a low power CPLD (complex programmable logic device) allowing for communication to a supervisory section of a functional module, which may be powered by the management module. This allows for some of the high availability features, such as turning power on or off to the remaining portions of the functional module.

Ethernet, while being widely used primarily due to its ease of integration with processors, has as its only redeeming features in a single processor chassis for internal communications (e.g., a four-pin interface). In order to simplify the hardware (avoiding clock-data recovery problem) in the SCC, according to one embodiment, five pins may be used in addition to the module presence indicator. In one embodiment, with relatively minor design effort, Ethernet may be used as a physical layer for the SCC, particularly, when the application is such that the management module is intended to control modules residing in other chassis.

According to one embodiment, a relatively fast and powerful version implemented in an FPGA (field programmable gate array) and/or a relatively slow and power saving version implemented in a CPLD may be implemented and connected to the same back plane signals within the same management module. The management module can select which one of the FPGA and/or CPLD of a functional module it desires to communicate with.

According to one embodiment, when a functional module is initialized (e.g., inserted into a slot), the management module provides power to a supervisory section of the functional module, which may include a relatively low power and low speed CPLD, a memory (e.g., PROM) having a module ID, as well as other status information, such as, for example, temperature, etc. The supervisory section may also include relatively low level controls, such as back-end power, resets, and LEDs, etc. Back-end power refers to the power that powers the primary functionality of the module. In one embodiment, the supervisory section provides basic communication and control independent of the primary functionality of the module.

According to one embodiment, a module presence detection pin is pulled high or low as a result of insertion of a functional module in a specific slot. This may result in an interrupt message sent to a memory section (e.g., interrupt memory section) dedicated for the respective slot. A processing logic of the management module reads one or more registers to determine the source of the interrupt, which identifies the respective slot. The processing logic sets the appropriate interrupt mask bits as part of its general interrupt handing routine. The processing logic reads the interrupt message, which may contain the information regarding the module insertion. Thereafter, the processing logic may enable a specific SCC corresponding to the respective slot.

Once the SCC has been established, the processing logic of the management module may attempt to retrieve data, such as, a module ID, temperature, power, reset, and LED status, etc., from the functional module. In one embodiment, in order to retrieve data from the functional module, the processing logic of the management module writes to a predetermined address of a memory region mapped to a slot in which the functional module is inserted. In one embodiment, this memory region may be mapped to one or more registers and/or RAM (random access memory) of the functional module. The information written indicates what type of data is being requested. The processing logic of the management module then writes to a specific offset within an address range of another memory region corresponding to the slot with the format of memory location offset and a length of the requested data to be sent back.

In response to the request, a processing logic of a functional module may then select or obtain the requested data and write the data to the management module while holding the appropriate flags to direct the data to the appropriate memory section of the management module. The functional module does not need to know the address of the management module as it is a point-to-point link. The only addressing it needs to perform is within the address range of the appropriate memory section on the management module. This write-only protocol has the benefit of greatly simplifying the hardware and also protects the processor from becoming "hung-up" if the targeted module is down when the management module attempts to read and cannot get a reply.

According to one embodiment, when the data from a functional module has been written into the status and/or read-reply memory sections allocated to the associated slot, an indicator bit, also referred to as a memory section access indicator, is set indicating that memory section has been written to by a functional module. In addition, there is an interrupt mask bit associated with each memory section access indicator bit. According to one embodiment, if the appropriate mask bit has been set (e.g., enabled), an interrupt will be sent to a processor of the management module. When the processing logic of the management module writes to the relevant memory section, the indicator and/or the resultant interrupt are cleared.

As mentioned above, a memory section of a management module may be used to map one or more registers and/or RAM of a functional module. A processing logic of the management may write through the SCC to a memory mapped register on a functional module. In one embodiment, such a write operation to one or more predetermined memory mapped registers may turn on the power to the back-end of the functional module. The back-end power is used to power up a remaining portion, other than the supervisory section, of the functional module, which may be powered up by the management module.

Furthermore, a functional module may, upon detecting a specific situation, send an interrupt to a management module. In one embodiment, a functional module may send an interrupt to a management module by writing one or more values to one or more memory locations of the management module dedicated to the slot in which the functional module resides. In a particular embodiment, a functional module writes a message to a management module while holding one or more specific flags active to direct the data to a specific memory section (e.g., interrupt memory section) of the management module. The data will be delivered to the interrupt memory section of the management module dedicated to the slot associated with the functional module. A memory section access indicator for the corresponding memory section is set. As a result, an interrupt is generated within the management module. An interrupt handler will be able to determine the source (e.g., the corresponding slot) of the interrupt and the cause of the interrupt from the specific message stored in the interrupt memory section. Thereafter, the management module performs certain operations in response to the determination of the interrupt.

Exemplary Optical Network Element

FIG. 1A is a block diagram illustrating an exemplary optical network element according to one embodiment of the invention. In one embodiment, exemplary optical network element 100 includes, but is not limited to, one or more wavelength switching modules (WSMs) 101, one or more optical amplification and filtering modules (OAFs) 102-103, an optical performance module (OPM) 104, one or more shelf control modules (SCMs) including an optical SCM (SCMo) 105 and an electrical SCM (SCMe) 106, and one or more DWDM transmitter/receiver (DTRs).

For the purposes of illustration only, the exemplary optical network element 100 is shown having one direction of traffic. It will be appreciated that the exemplary optical network element 100 may handle both directions of traffic. For example, both OAFs 102-103 may handle both incoming optical signals and outgoing optical signals. In addition, OPM 104 and SCMs 105-106 may be coupled to OAF 103.

In one embodiment, OAFs 102-103, WSMs 101, OPM 104, and SCMo 105 may be implemented within an optical shelf 110, while SCMe 106 and DTRs 108 may be implemented within an electrical shelf 120 (also referred to as an optical-electrical-optical or OEO shelf). Alternatively, SCMo 105 and SCMe 106 may be implemented as a single module. Other configurations may exist.

According to one embodiment, OAFs 102 and 103 deal with most of the DWDM multiplexing aspects of a particular network fiber. In the incoming direction, OAF 102 pre-amplifies the incoming multiplexed DWDM signals and may fix pulse distortion due to chromatic dispersion prior to demultiplexing them down to individual wavelengths (channels). In the outgoing direction, OAF 103 combines the individual channels and may boost the multiplexed DWDM signal prior to sending to the next node.

In one embodiment, WSM 101 implements call set-up and tear down requests. The WSM 101 allows the redirection of "through" signals that are incoming on one network fiber (e.g., incoming from any OAF) to exit on any of one the outgoing network fibers (e.g., sent to any OAF). The WSM 101 also provides the ability to power adjust the optical signals so that they are at the correct power level when they leave the OAF. The WSM 101 also contains optical "taps" that send certain percents (e.g., 5%) of the signal to monitoring devices (e.g., photonic detectors). The purpose of the monitoring devices is to indicate presence or absence of signal for diagnostic or protection switching purposes. Use of these photo detectors for detecting the presence and absence of signals (e.g. Loss of Signal, LOS) will be faster than relying on the OCM/OPM and will be key for us to ensure the fastest recovery optical signals possible.

Figure 1B:
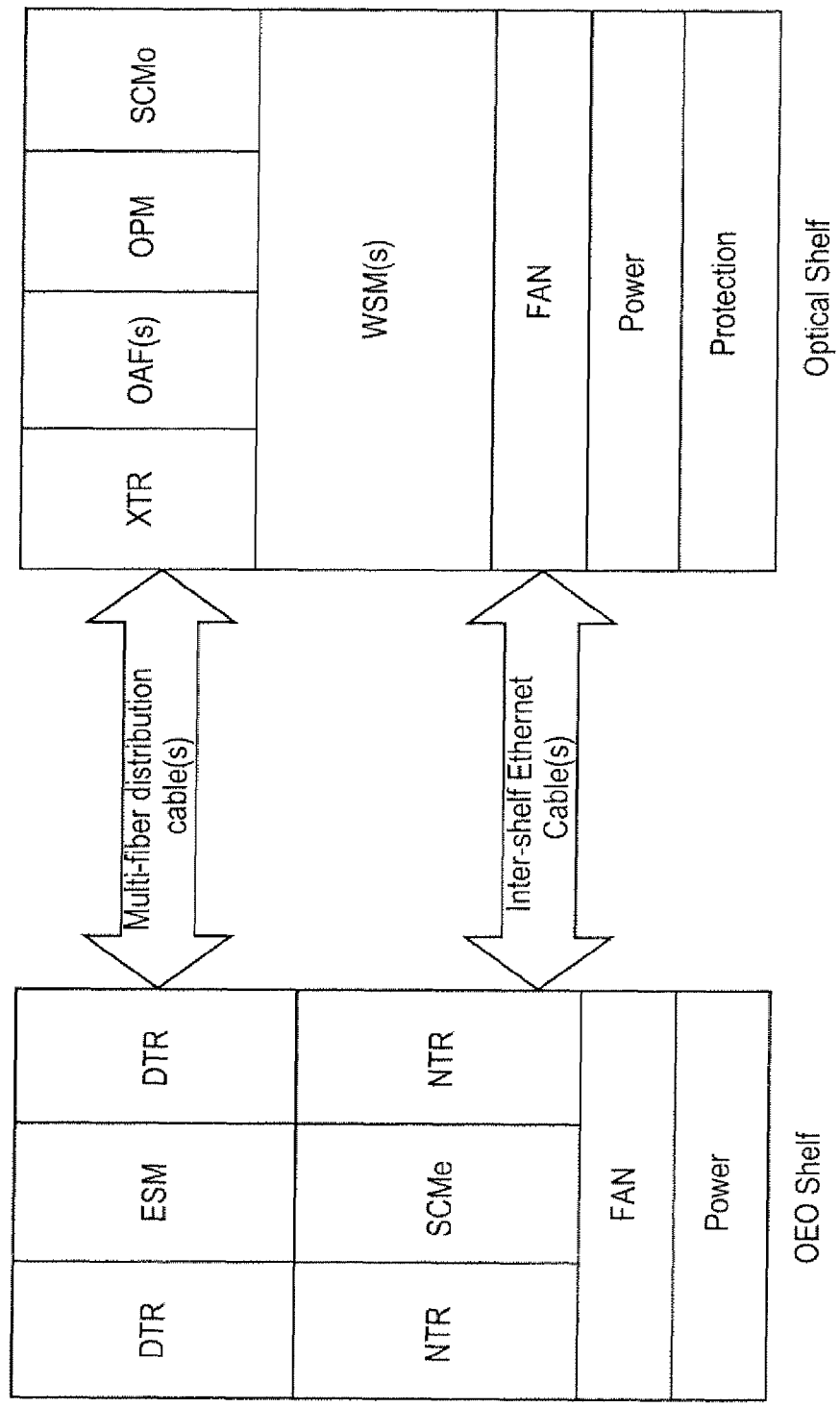

In one embodiment, OPM 104 is an instrument grade module and may be shared among a number of modules or ports. In one embodiment, OPM 104 is responsible to provide the source and detection mechanisms to participate in LMP processes for discovery and fault isolation, to provide emergency diagnostic capabilities, to provide feedback signal to allow proper VOA (variable optical attenuation) setting, and to gather information relating to health of system. In one embodiment, DTRs 108 may be a part of an ADM for transmitting and receiving DWDM signals. Other modules, such as, for example, ESM (electronic switch module), NTR (non-DWDM transmitter/receiver), cooling fan, power, and protection modules, as shown in FIG. 1B according to an alternative embodiment, may be included.

In one embodiment, SCMo 105 and SCMe 106 each includes a processor and non-volatile storage and is responsible for managing the operation of the optical and electrical shelves respectively. SCMo 105 and SCMe 106 are referred to herein as management modules for the respective optical shelf and electrical shelf, while the rest of the modules 101-105 and 108, as well as those not shown, may be referred to as functional modules. According to one embodiment, each of the SCMo 105 and SCMe 106 is communicatively coupled to the functional modules it manages via an SCC. Each of the SCMs includes a first memory region and a second memory region. The first memory region is used by the functional modules to communicate with the management module while the second memory region is used by the SCM to communicate with the functional modules. Each of the first and second memory regions may include multiple memory sections and each of the memory sections corresponds to one of the functional modules.

According to one embodiment, each of the memory sections of the first memory region may include a read-reply memory segment, a status memory segment, and an interrupt memory segment. The read-reply memory segment is used by a functional module to transmit data to a management module in response to a request from the management module. Status memory segment is used by a functional module to send status information regarding status of the functional module periodically or in response to a request from the management module. The interrupt memory segment is used by a functional module to "send" an interrupt to the management module by writing to one or more predetermined location of the interrupt memory segment. Other configurations may exist.

FIG. 2 is a block diagram illustrating an exemplary management module (e.g., SCM) of an optical network element, according to one embodiment. For example, exemplary SCM 200 may be implemented as SCMo 105 and/or SCMe 106 of FIG. 1A. In one embodiment, SCM 200 includes a processor 201 and a non-volatile storage 202 and is responsible for managing the operation of a specific shelf (e.g., optical shelf 110 or OEO shelf 120 of FIG. 1A). In one embodiment, processor 201 (to host the routing and element management functions) may be a Motorola 8270 processor, which allows commonality with the framer processor. The SCM also provides a non-volatile memory 202 (program storage, configuration database, statistics, etc.).

In addition, according to one embodiment, SCM 200 provides an external RS-232 electrical interface 203 for craft personnel. Other management interfaces (e.g., Ethernet, external alarm contacts 204) may be brought out on the backplane and delivered to other simple modules, which may reside on a PROT row.

Further, communication between cards within a shelf (e.g., optical and/or electrical shelves) is via a direct memory storage/mailbox scheme. This provides relatively high-speed communications (e.g., few Mbt/s) with low latency and priority. In one embodiment, Ethernet interface 206 is used to communicate between an optical shelf and a management system, between shelves, and/or between nodes on the OSC (optical supervisory channel).

In one embodiment, OSC 207 shares a L2/L3 switch with the inter-shelf communications. The L2/L3 switch has a large number of capabilities built in (including VLAN support) that can be used to ensure that traffic only goes to the intended network. For example, users only have to assign an IP to the node. By default, all other needed addresses have been pre-assigned and the node will come up fully operational. The fail-over of an SCM or optical shelf will result in no external device being able to detect an address change.

Within a shelf, the SCM may be redundant (e.g., an active and a standby SCM). The SCMs associated with one of the optical shelves may be designated as the system controllers. The system controllers have control over both the optical and OEO shelves in the node. A telnet session or SNMP connection for management purposes may be made with the system controller.

Figure 3:
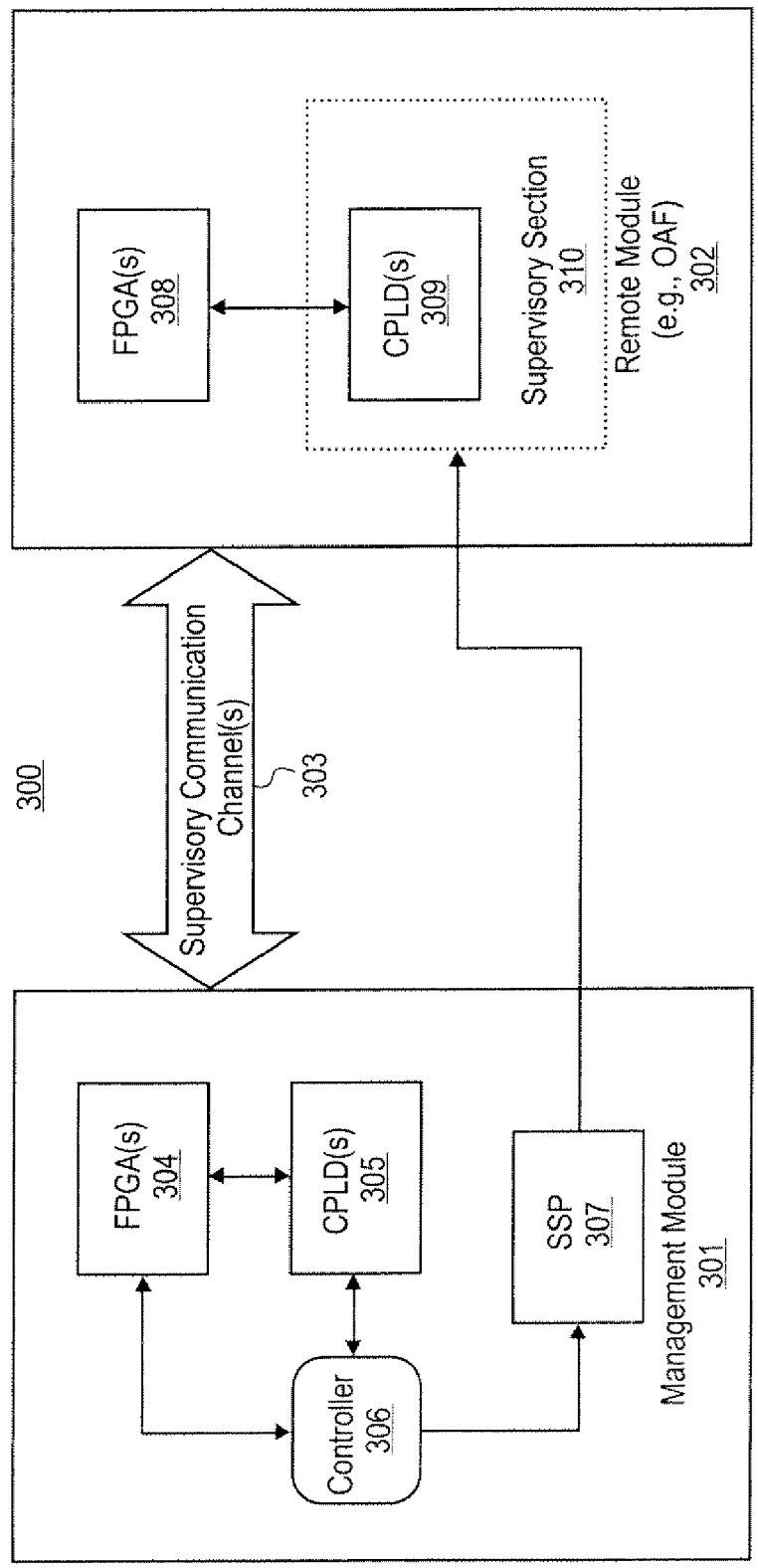
FIG. 3 is a block diagram illustrating an exemplary communication scheme between a management module and a functional module, according to one embodiment.

FIG. 3 is a block diagram illustrating an exemplary communication scheme between a management module and a functional module, according to one embodiment. In one embodiment, exemplary scheme 300 includes a management module 301 communicatively coupled to a functional module 302 via a supervisory communication channel (SCC) 303. In one embodiment, the SCC 303 may be a half-duplex point-to-point communication link.

In one embodiment, the management module 301 includes one or more FPGAs 304 and one or more CPLDs 305 controlled by a controller 306. The FPGAs 304 may be used to handle relatively high-speed communications between the management module 301 and the functional module 302, while the CPLDs 305 may be used to handle relatively low-speed communications. The controller 306 may be implemented as hardware (e.g., micro-controller or processor), software, or a combination of both.

Similarly, the functional module 302 includes one or more FPGAs 308 and CPLDs 309 for the similar purposes. In addition, according to one embodiment, the CPLDs 309 may be implemented as a part of a supervisory section 310 of the functional module 302, which may be powered up by a supervisory section power (SSP) 307 of the management module 301. That is, the supervisory section 310, including CPLDs 309, may be powered up by the SSP 307 when it is inserted into a slot of a shelf, while the rest of the components, such as, for example, FPGAs 308, may be powered up by a back plane power supply (not shown) of the functional module 302. The supervisory section 310 may include a storage (e.g., RAM or PROM) or logic (not shown) to provide configuration and/or operating environment information, such as, for example, a module ID, operating temperature, power, reset, and/or LEDs status etc., of the functional module 302 to the management module 301 when needed. This information may be retrieved by the management module 301 when it detects that the functional module 302 is inserted into a slot, particularly, after the SSP 307 powers up the supervisory section 310 of the functional module 302.

In one embodiment, the management module 301 may include a storage or memory (not shown) having the configurations described above. For example, the management module 301 may include a memory having two memory regions. One memory region may be used by the functional module 302 to access the management module 301, which may include a read-reply, status, and/or an interrupt memory sections as described above. The other memory region may be used by the management module 301 to access the functional module 302. One or more registers and/or a system memory of the functional module 302 may be mapped to the other memory region. As a result, the management module 301 may access one or more registers of the functional module 302. Both memory regions may reside logically or physically within a memory device of the management module. Alternatively, they may reside separately. Each memory section or region may include multiple segments and each segment corresponds to a slot in which a functional module (e.g., functional module 302) is inserted, as described above. Other configurations may exist.

Figure 4:
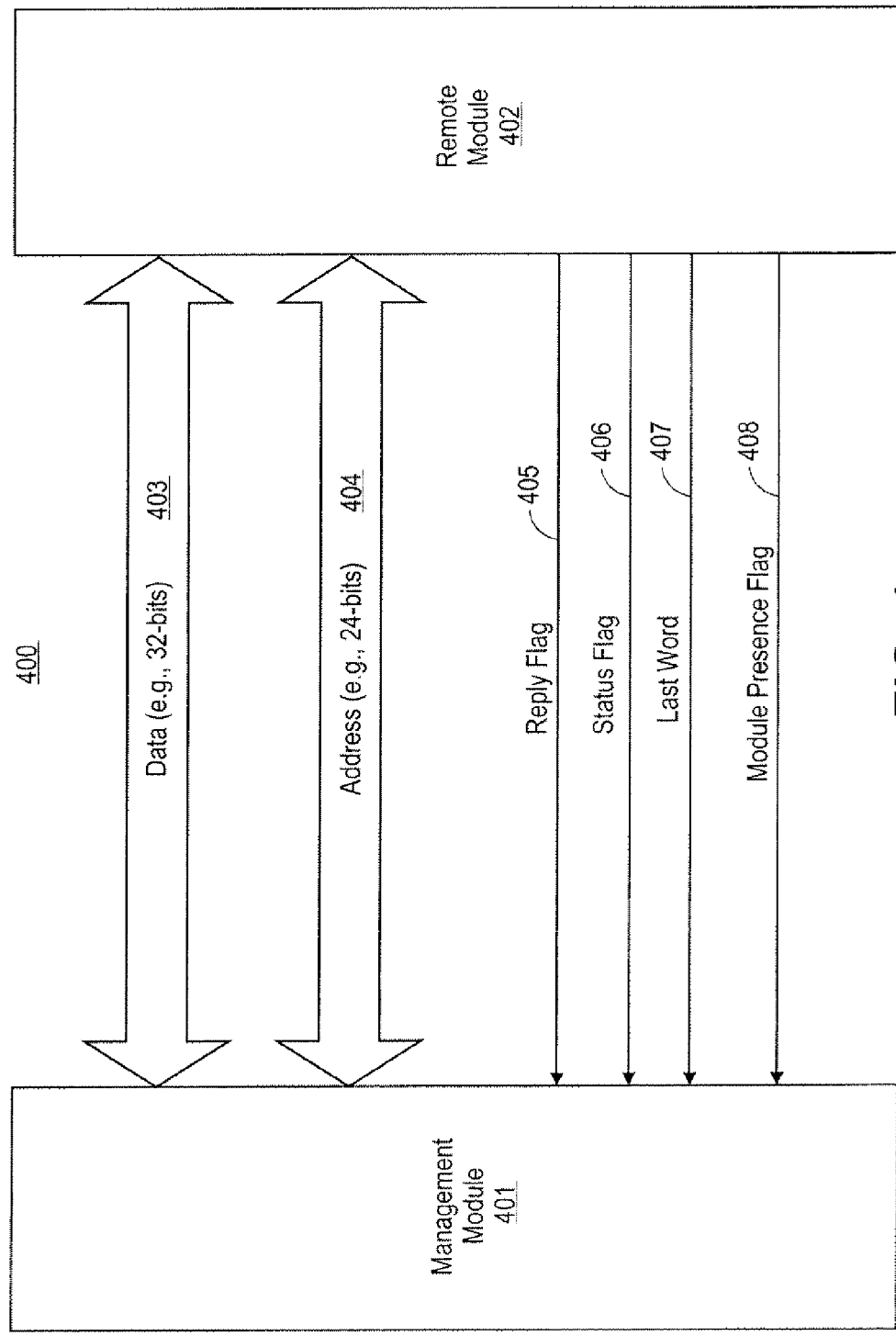
FIG. 4 is a block diagram illustrating an exemplary SCC communication between a management module and a functional module, according to one embodiment.

FIG. 4 is a block diagram illustrating an exemplary SCC communication between a management module and a functional module of an optical network element, according to one embodiment. In one embodiment, the exemplary SCC 400 includes a management module 401 communicatively coupled to a functional module 402 via an SCC. The SCC may include one or more data lines 403 and address lines 404. The SCC may be implemented as a half-duplex point-to-point communication link. In one embodiment, at least one of the data lines includes 32 bits. In one embodiment, at least one of the address lines includes 24 bits with 32-bit accesses. The rest of the six bits may be used to specify other attributes of the address being communicated. For example, according to one embodiment, some of the rest of the bits may be used to specify the length of the data carried over via the data line(s) 404.

In one embodiment, the management module 401 may include a storage or memory (not shown) having the configurations described above. For example, the management module 401 may include a memory having two memory regions. The first memory region may be used by the functional module 402 to access the management module 401, which may include a read-reply, status, and/or an interrupt memory sections as described above. Dependent upon a type of the data being transmitted from the functional module 402 to the management module 401, the transmitted data may be directed to one or more of the read-reply, status, and interrupt memory sections. The second memory region may be used by the management module 401 to access the functional module 402, for example, via memory mapped registers or RAM of the functional module 402.

In addition, the functional module 402 may be coupled to the management module 401 via one or more communication flags 405-406. The flags 405-406 may be implemented as one or more physical pins coupling the two modules 401-402. Alternatively, the flags 405-406 may be implemented logically within one or more packets transmitted over the data and/or address lines 403-404. In one embodiment, one or more of these flags may be used to specify which of the memory sections (e.g., the read-reply, status, and interrupt memory sections) that the data being transmitted will be directed to.

In a particular embodiment, an exemplary of mapping the flags 405-406 with respect to the memory sections being directed to is shown as follows:

|  | Status Flag | Read-reply Flag |
|---|---|---|
| Status Section | 1 | 0 |
| Read-Reply Section | 0 | 1 |
| Interrupt Section | 1 | 1 |

Note that the logical values corresponding to the flags are shown for illustration purposes only. Other logical values or arrangements may also be implemented. In one embodiment, the read-reply, status, and interrupt memory writes may be interleaved.

According to a further embodiment, a last word flag 407 may be implemented to indicate that the last word of the data being transmitted has been transmitted. As a result, when the management module 401 receives such an indication, the management module 401 may retrieve the data from the appropriate memory section(s) and process the data. As described above, a module presence flag 408 may also be implemented to indicate whether the functional module 402 has been inserted into a slot. In response to such an indication, the management module 401 may process any initialization of the functional module 402, such as, for example, powering up at least a portion of the functional module 402 (e.g., supervisory section) and retrieve any configuration and/or operating environment information of the functional module.

Figure 5:
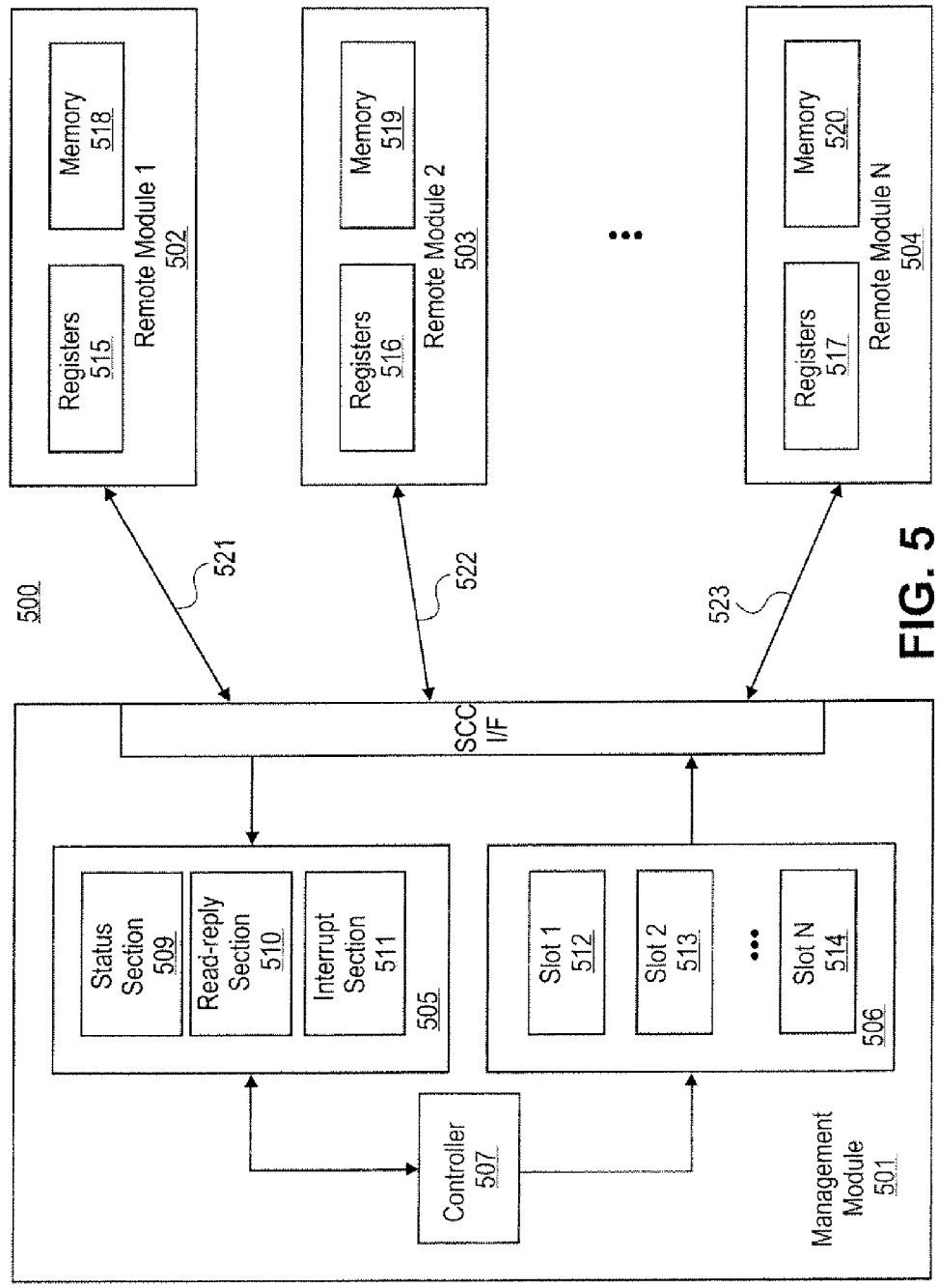
FIG. 5 is a block diagram illustrating an exemplary communication scheme between a management module and one or more functional modules, according to one embodiment.

FIG. 5 is a block diagram illustrating an exemplary communication scheme between a management module and one or more functional modules, according to one embodiment. In one embodiment, exemplary scheme 500 includes a management module 501 communicatively coupled to one or more functional modules 502-504 via supervisory communication channels 521-523 of an SCC interface 508 respectively. In one embodiment, the management module 501 includes, but is not limited to, a first memory region 505 and a second memory region 506 controlled by a controller 507. Any one of the SCCs 521-523 may be implemented in a configuration similar to the one shown in FIG. 4.

As a described above, according to one embodiment, the first memory region 505 may be used by one or more functional modules 502-504 to communicate with the management module 501 by accessing the first memory region 505. The second memory region 506 may be used by the management module 501 to communicate with one or more of the functional modules 502-504 by accessing the second memory region 506. The first and second memory regions 505-506 may be implemented within a physical memory device. Alternatively, they may be implemented within multiple separate memory devices. The first and second memory regions may be implemented logically or physically consecutive or non-consecutive.

In one embodiment, the first memory region 505 includes, but is not limited to, a status section 509, a read-reply section 510, and an interrupt section 511. The status section 509 is used by any one of the functional modules 502-504 to send status of the respective functional module to the management module 501 periodically. Alternatively, upon a request received from the management module 501, for example, by accessing one or more predetermined locations of the second memory region 506 corresponding to the respective functional module.

In one embodiment, the read-reply section 510 may be used by any one of the functional modules 502-504 to send (e.g., reply) data requested by the management module 501, where the request for the data may be received from the management module 501 via the second memory region 506. In a particular embodiment, the management module 501 may write one or more values to one or more predetermined locations of the second region corresponding to the respective functional module.

In one embodiment, the interrupt section 511 may be used by any one of the functional modules 502-504 to "send" an interrupt to the management module 501. In a particular embodiment, a functional module may write one or more values to one or more locations of the interrupt section 511 in order to "send" an interrupt to the management module 501. A memory write to the interrupt section 511 may cause an interrupt generated within the management module, where an associated interrupt routine may be handled, for example, by controller 507, which may be implemented as hardware, software, or a combination of both.

In one embodiment, at least one of the sections 509-511 may be segmented into one or more memory segments and each of the segments corresponds to one of the functional modules 502-504 respectively. Thus, any one of the functional modules 502-504 may only access a memory segment corresponding to a slot in which the respective functional module is inserted. When a functional module writes to the management module 501, it can only (e.g., exclusively) write to the specific memory segment allocated for the respective functional module without overlapping other memory segments allocated for other functional modules. A safety mechanism may be implemented to protect a memory segment of a functional module from being accessed by other functional modules.

The data transmitted by a functional module may be directed to one or more of the memory sections 509-511, dependent upon the flag configurations as shown in FIG. 4 and described above. Note that the memory regions 505-506 and/or memory sections 509-511 are shown for illustration purposes only. More or less memory sections or regions may be implemented.

The one or more memory segments within any one of the memory sections 509-511 may be statically allocated given a number of the functional modules the management module supports. Alternatively, the one or more memory segments may be dynamically allocated for a functional module in response to an indication that the respective functional module is inserted into a slot, for example, via a module presence flag 408 of FIG. 4.

According to one embodiment, the second memory region 506 includes, but is not limited to, one or more memory segments 512-514 and each of the memory segments 512-514 may be allocated for one of the functional modules 502-504 respectively. Thus, when a management module 501 sends data to one of the functional modules 502-504, it may write to a memory segment corresponding to a slot in which the intended functional module is inserted. Similar to the first memory region 505, the memory segments 512-514 may be allocated statically or dynamically dependent upon a specific configuration of the management module.

According to one embodiment, each of the segments 512-514 may be mapped to one or more registers 515-517 and/or memories 518-520 of functional modules 502-504 respectively. Assuming functional module 502 is inserted into slot 1 having a memory segment 512 allocated for the slot, the management module 501 may access the one or more registers 515 and/or memory 518, as well as other resources of the functional module 502 by accessing the memory segment 512.

Exemplary Memory Configurations

Figure 6:
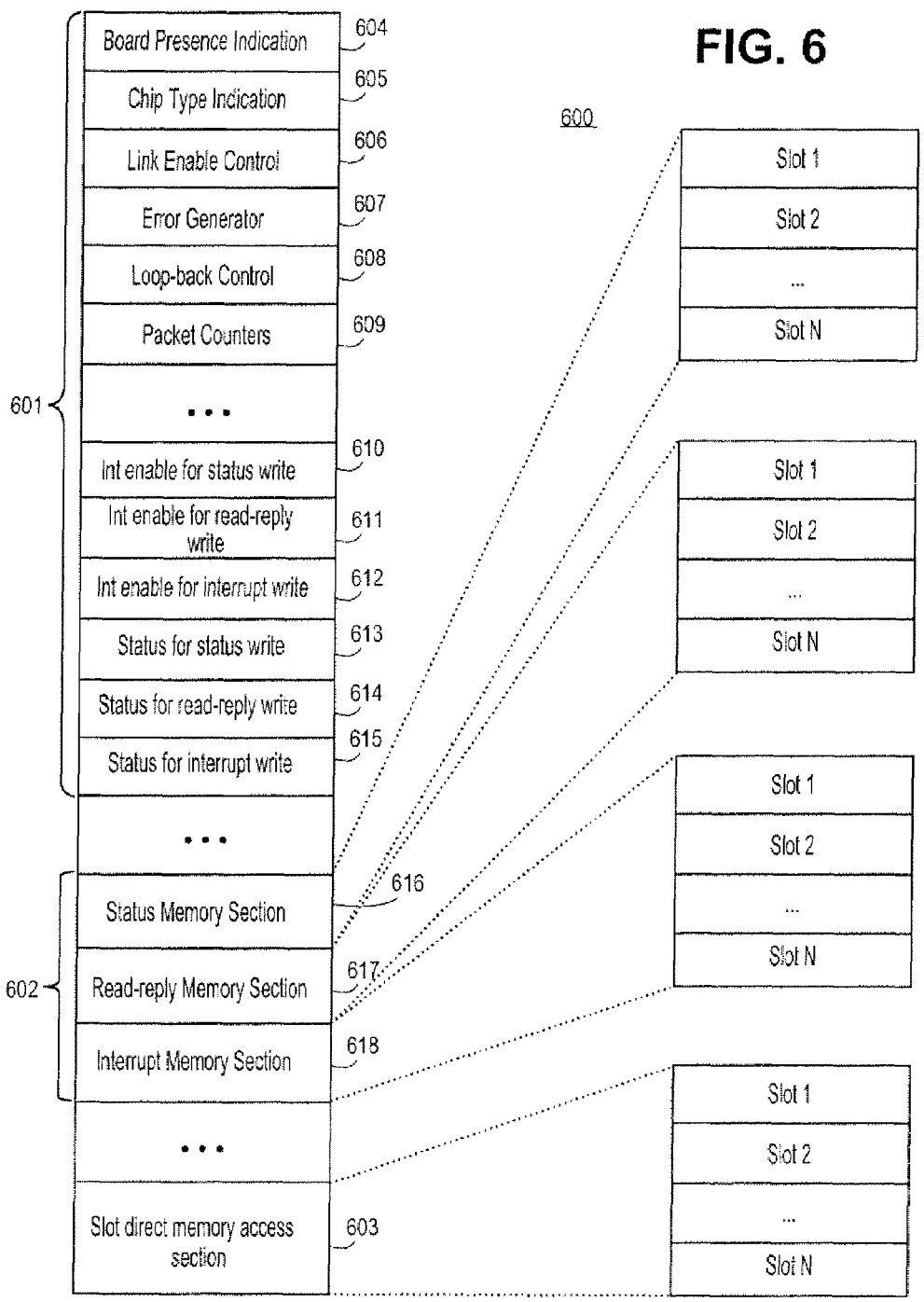
FIG. 6 is a block diagram illustrating an exemplary memory configuration of a module according to one embodiment of the invention.

FIG. 6 is a block diagram illustrating an exemplary memory configuration of a module according to one embodiment of the invention. For example, exemplary memory configuration (also referred to as a memory map) 600 may be implemented as a part of a memory of a management module, which may include memory regions 505-506 of FIG. 5. In one embodiment, exemplary memory map 600 includes, but is not limited to, a first memory region 601, a second memory region 602, and a third memory region 603. Note that the configuration shown in FIG. 6 is for illustration purposes only. The memory regions 601-603, as well as any memory segments or blocks therein may be implemented in any other configurations apparent to one with ordinary skill in the art.

In one embodiment, multiple FPGAs (e.g., FPGAs 304 of FIG. 3) may be implemented to handle a relatively large number of functional modules, wherein each FPGA may handle a predetermined number (e.g., 10) of functional modules for the purposes of load balancing. When multiple FPGAs are implemented, either within a physical memory device or multiple memory devices, multiple copies of memory region 601 may be implemented, where one copy of memory region 601 corresponds to one FPGA. Other configurations may exist.

In one embodiment, the first memory region 601 includes, but is not limited to, one or more memory blocks including memory blocks 604-615. In one embodiment, the board presence indication block 604 may be used to indicate whether one or more functional modules have been inserted into one or more slots respectively. In one embodiment, the board presence indication block 604 includes a number of bits, where each bit corresponds to one of the functional modules the management module supports. Thus, when a functional module is inserted into a slot, a bit corresponding to the slot may be set to a predetermined logical value (e.g., logical values of one or zero). The board presence indication block 604 is a read-only block.

In one embodiment, the chip type indication block 605 may be used to indicate whether a FPGA associated with the memory region (e.g., memory region 601) is configured in an optical shelf or an OEO shelf. For example, when a respective FPGA is implemented within an optical shelf, a string of "OPT1" (e.g., ASCII values of 0×4F, ×50, 0×54, 32) may be stored in the chip type indication block 605, where the value of "1" indicates that the respective FPGA is a first FPGA, etc. Similarly, if the respective FPGA is implemented within an OEO shelf, a string of "OEO1" (e.g., ASCII values of 0×4F, 0×45, 0×4F, 32) may be stored in the chip type indication block 605, where the value of "1" indicates that the respective FPGA is a first FPGA, etc.

In one embodiment, the link enable control block 606 may be used to enable or disable a link linking with a specific slot. The link enable control block 606 may be implemented as a bitmap, where each bit corresponds to one of the slots supported. A predetermined logical value of a bit enables/disables a slot associated with the bit. In a particular embodiment, a logical value of "1" of a bit enables a link (e.g., output pin) linking with a slot associated with the bit, while a logical value of "0" of the bit disables the link.

In one embodiment, the error generator block 607 may be used by an error generator of a management module, which will be described in details further below. In one embodiment, the error generator block 607 includes a first field (e.g., bits 6-0) that may be used to determine where in the packet (e.g., positions) one or more bits may be inverted for generating an error for the purposes of verifying one or more functionality of the system. In addition, the error generator block 607 includes a second field (e.g., bit 7) to indicate whether the error will be inserted into a packet on a transmission or receiving sides of an SCC interface. In a particular embodiment, a logical value of one indicates that an error should be generated on the transmission side. Likewise, a logical value of zero indicates that an error should be generated on the receiving side of the SCC interface.

In one embodiment, the loop-back control block 608 may be used to enable or disable a loop-back functionality of one or more SCC interfaces to one or more functional modules, which will be described in details further below. The loop-back control block 608 may be implemented as a bitmap, where each bit indicates whether a loop-back functionality of an SCC interface associated with the bit is enabled. In a particular embodiment, a logical value of one indicates that an associated loop-back functionality is enabled. Likewise, a logical value of zero indicates that an associated loop-back functionality is disabled.

In one embodiment, packet counter block 609 may be used to count number of packets that have been transmitted and/or received successfully and/or unsuccessfully. According to one embodiment, the packet counter block 609 includes multiple sub-sections and each of the subsections corresponds to a slot in which a functional module may be inserted and managed by an FPGA. In a particular embodiment, each sub-section includes one or more counters. In a particular embodiment, a first counter may be used to count a number of packets that have been received successfully. A second counter may be used to count a number of packets that have been received unsuccessfully. A third counter may be used to count a number of packets that have been transmitted successfully. A fourth counter may be used to count a number of packets that have been transmitted unsuccessfully. In a further embodiment, one or more of these counters may be 32-bit counters. Multiple copies of the packet counter block 609 may be implemented if multiple FPGAs are implemented, where each packet counter block 609 corresponds to one FPGA.

According to one embodiment, the interrupt enable registers for status write 610, read-reply write 611, and interrupt write 612 may be used to enable and/or disable an interrupt when the status memory section, read-reply section, and interrupt memory section 602 are accessed by a remote functional module. According to one embodiment, at least one of the interrupt enable registers 610-612 may be implemented as a bit mask, where each bit corresponds to a slot in which a functional module is inserted. If a bit is set to a first predetermined logical value (e.g., a logical value of one), an interrupt of the corresponding slot is enabled. As a result, when the corresponding functional module accesses a respective memory section (e.g., status memory section 616), an interrupt may be generated within the management module. The management module may in turn check interrupt message in the corresponding memory section (e.g., status memory section 616). Likewise, if the bit is set to a second predetermined logical value (e.g., a logical value of zero), no interrupt will be generated when the functional module accesses the corresponding memory section.

As described above, the interrupt status of a specific memory section may be determined by accessing the memory section 602, which includes status memory section 616, read-reply memory section 617, and interrupt memory section 618. In one embodiment, each of the memory section accesses may be indicated via one or more status registers 613-615 corresponding to the status memory section 616, read-reply memory section 617, and interrupt memory section 618. Memory sections 616-618 may be implemented as memory sections 509-511 of FIG. 5.

In a particular embodiment, the status register 613 for status memory write may be implemented as a bit mask, where each bit corresponds to a slot in which a functional module is inserted. When a bit is set to a first predetermined logical value (e.g., a logical value of one), it indicates that a "last word" has been received from the corresponding remote module into the status memory section corresponding to that slot. If a single word is being send from the remote module, then the "last word" will be active for that word. If multiple words are being sent from the remote module, then the "last word" will be active only on the last word to be sent in that group. If a bit is set to a second predetermined logical value (e.g., a logical value of zero), the status memory section for the slot has never been written by a remote module since the last reset or alternatively, the status memory section has been written by the management module since the last time a "last word" was written. Similar configurations may be implemented for status registers 614-615 for read-reply and interrupt writes.

In addition, according to one embodiment, exemplary memory map 600 includes a slot direct memory access section 603 that allows a management module to access resources (e.g., a register and/or memory) of one or more remote functional modules. Memory section 603 may be implemented as memory section 506 of FIG. 5. In one embodiment, the exemplary memory section 603 may be configured as multiple segments, where each segment corresponds to a slot in which a remote functional module is inserted. At least a portion of each memory segment may be mapped to one or more registers and/or memory (e.g., RAM) of the corresponding functional module. The management module accesses a functional module by accessing a corresponding memory segment of the slot direct memory section 603.

Figure 7:
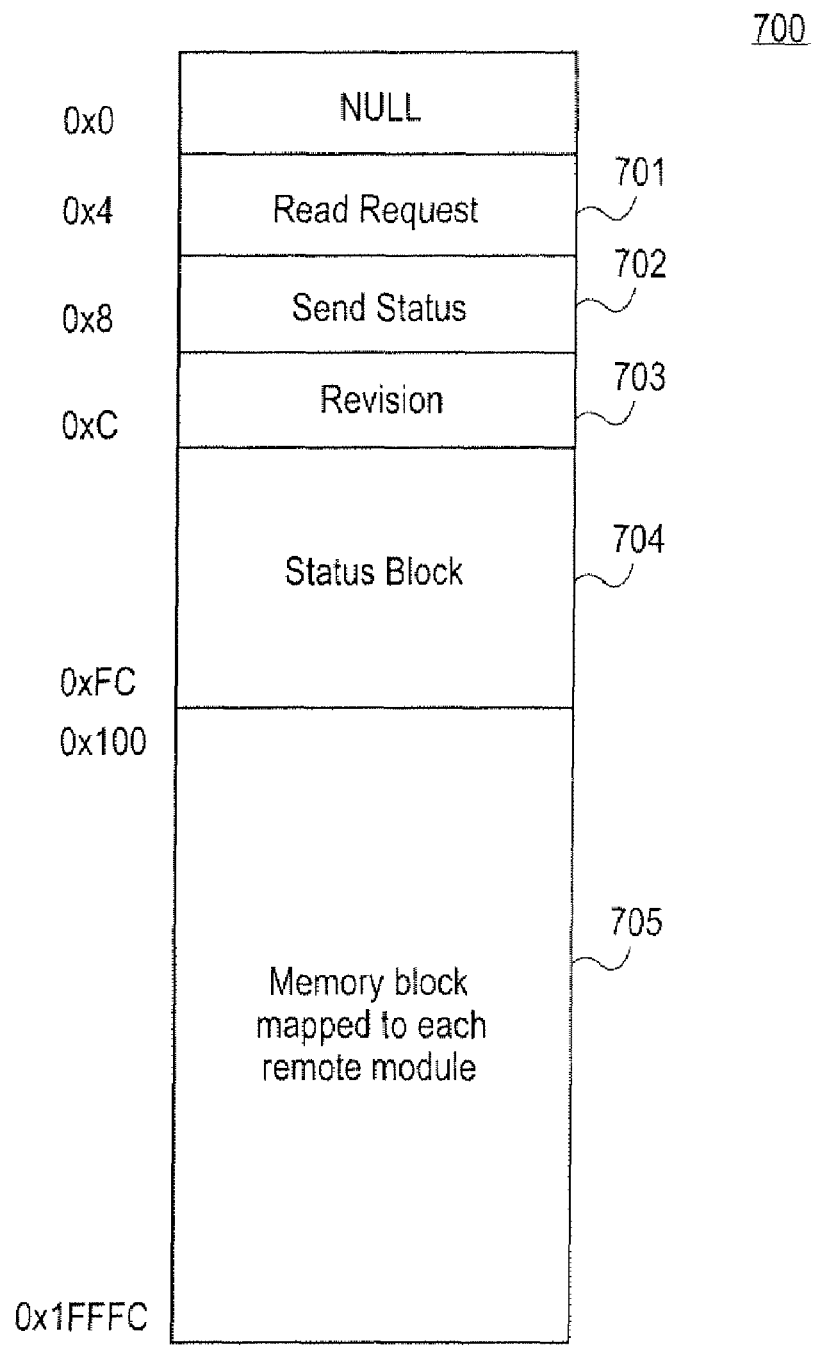
FIG. 7 is a block diagram illustrating an exemplary memory configuration of a slot direct memory access section, according to one embodiment.

FIG. 7 is a block diagram illustrating an exemplary memory configuration of a slot direct memory access section, according to one embodiment. For example, exemplary memory map 700 may be implemented as a part of memory section 603 of FIG. 6. In one embodiment, the exemplary memory map 700 includes, but is not limited to, a read-reply register 701, a send status register 702, a revision register 703, a status block 704, and a memory block 705 that may be mapped to one or more registers and/or memory of a remote module. Note that the exemplary configuration shown in FIG. 7 is shown for illustration purposes only. The registers 701-705 may or may not be configured in a consecutive manner and they may be located at offsets that are different then those shown in FIG. 7. Other configurations may be applied.

In one embodiment, read-reply register 701 may be used by a management module to send a read-reply request to a remote module. The request may include a starting address of a read-reply memory segment corresponding to the slot, as well as a length of the data requested. In a particular embodiment, the read-reply register 701 includes 32 bits, where bits 31:24 may be used to specify the length of the requested data and bits 23:0 may be used to specify the starting address of the memory segment.

The send status register 702 may be used by a management module to request a status update from a remote module by writing one or more predetermined values to the register 702. In one embodiment, a value of 0xFFFFFFFF written into register 702 may cause the remote module to send a status block 704 to the management module. [Doug, what is different between this status block and status memory section we described above?] A revision register 703 may be used to indicate a revision of the VHDL code of a supervisory section of a remote module. Memory block 705 may be used to map one or more registers and/or a memory of a remote module.

Figure 8:
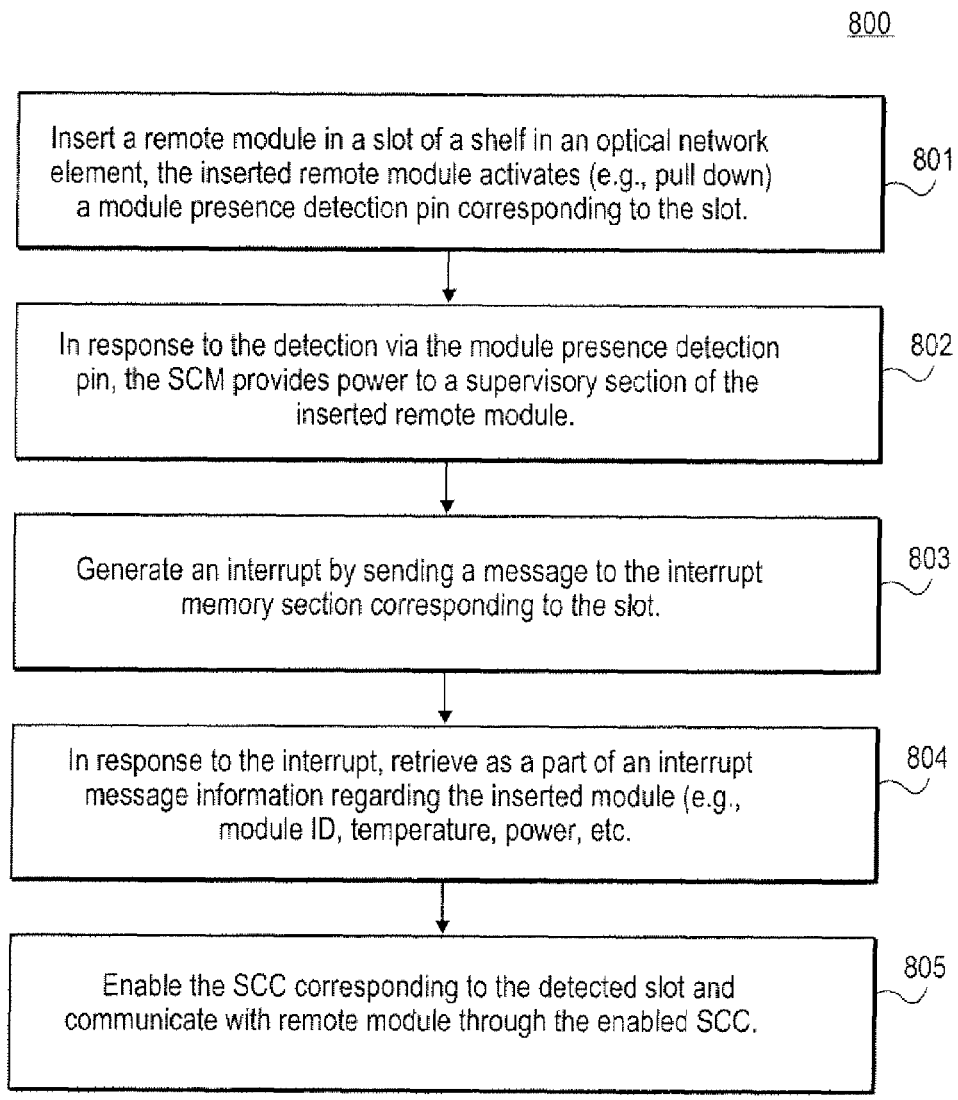
FIG. 8 is a flow diagram illustrating an exemplary process between a management module and a functional module, according to one embodiment of the invention.

FIG. 8 is a flow diagram illustrating an exemplary process between a management module and a functional module, according to one embodiment of the invention. Exemplary process 800 may be performed by a processing logic that may include hardware (circuitry, dedicated logic, etc.), software (such as is run on a dedicated machine), or a combination of both. For example, the exemplary process 800 may be used to initialize a remote module by a management module when the remote module is inserted into a slot. Referring to FIG. 8, at block 801, when a remote module is inserted into a slot manage by a management module, the management module detects such an insertion, for example, via a module presence flag 408 of FIG. 4. In response to the detection, at block 802, the management module provides power to a supervisory section (e.g., supervisory section 310 of FIG. 3) of the remote module. Meanwhile, at block 803, an interrupt is generated within the management module to an interrupt memory section corresponding to the slot. At block 804, in response to the interrupt, the management module retrieves, as a part of an interrupt message, information regarding the inserted remote module, such as, for example, a module ID, temperature, and/or power, etc., from the remote module. At block 805, the management module may enable a supervisory communication channel (SCC) with the corresponding remote module and thereafter, the management module and the remote module may communicate with each other via the enabled SCC. Other operations may also be performed.

Figure 9:
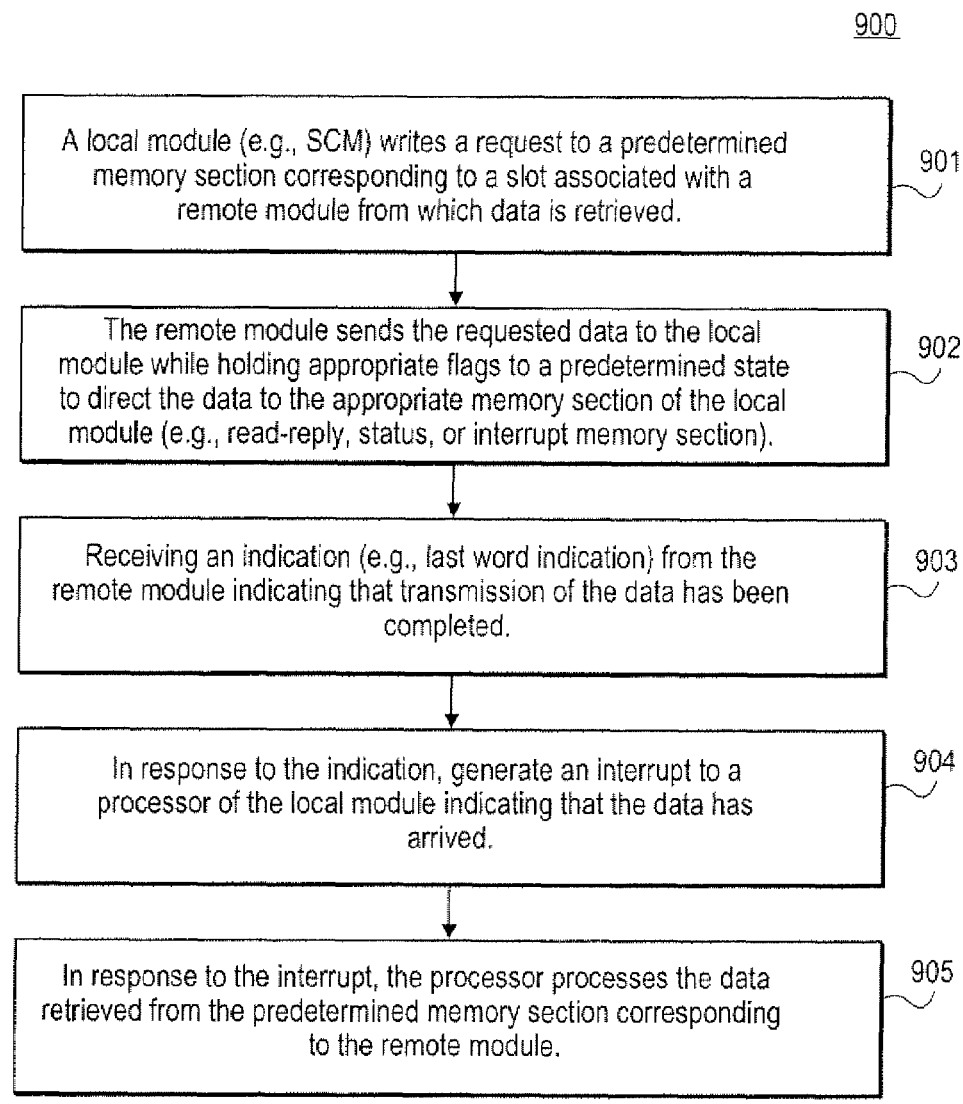
FIG. 9 is a flow diagram illustrating an exemplary process between a management module and a functional module, according to another embodiment of the invention.

FIG. 9 is a flow diagram illustrating an exemplary process between a management module and a functional module, according to another embodiment of the invention. Exemplary process 900 may be performed by a processing logic that may include hardware (circuitry, dedicated logic, etc.), software (such as is run on a dedicated machine), or a combination of both. In one embodiment, exemplary process 900 includes, but is not limited to, arranging a plurality of functional unit inserted in a plurality of slots managed by a management unit of the optical network element, and configuring a memory of the management unit into a plurality of memory regions, each of the plurality of memory regions corresponding to each of the slots and exclusively accessed by a functional unit inserted in the respective slot in order to communicate with the management unit.

Referring to FIG. 9, at block 901, a management module writes a request for data to a predetermined memory section corresponding to a slot in which a remote module is inserted. For example, the management module may write a request to read-reply register 701 of FIG. 7 to request a block of data to be sent from a remote module. Note that, it is assumed that the registers and/or memories of the remote module have been initialized by the management module, for example, via exemplary process 800 of FIG. 8. In response to the request, at block 902, the remote module sends the requested data to the management module while holding appropriate flags (e.g., flags 405-406 of FIG. 4) to a predetermined state to direct the requested data to an appropriate memory section (e.g., status, read-reply, and/or interrupt sections) of the management module. Once all of the requested data has been transmitted to the management module, at block 903, an indication (e.g., a "last-word" indication via flag 408 of FIG. 4)) is sent to the management module to indicate the end of the transaction. At block 904, an interrupt is generated within the management module in response to the indication, which may be enabled via interrupt enable register 611 of FIG. 6. At block 905, in response to the interrupt, the management module may process the requested data retrieved from the predetermined memory section (e.g., read-reply section) corresponding to the remote module. Other operations may also be performed.

Exemplary Error Detection, Generation, and Recovery Mechanisms

In order to provide verification mechanism to the inter-module communications, according to one embodiment, an error detection, generator, and recovery (EDGAR) mechanism is utilized. The EDGAR mechanism supports inter-module communication in a high availability system and ensures that no inter-module communication results in errors. The EDGAR detects any errors and reports them, recovers from errors in a robust manner, and generates errors when desired to perform the run-time verification of the error detection and recovery functionalities.

In one embodiment, the EDGAR provides an error detection and recovery at approximately the same level as the redundant circuits solution described above. The EDGAR also provides a mechanism to verify the functionality of the error detection and recovery circuitry and provides an extra layer of error detection between the strength of parity and checksum methods. The EDGAR utilizes relatively less logic to implement than ECC or redundant circuits solutions.

In one embodiment, the exemplary EDGAR includes, but is not limited to, a mirror component, a comparator, a bit counter, a send packet indicator, a transmission buffer, a retry circuit, a receive verifier, and one or more packet counters. The mirror component may be used to mirror the received data back to a transmitting module when the receiving module is not busy (e.g., not sending data). The comparator (of a transmitting module) may be used to verify that the reflected data is the same as that which was sent. The bit counter may be used to count a number of bits of a packet having a predetermined logical value (e.g., a logical value of zero). The send packet indicator may be used to send the number of bits having the predetermined logical value to a remote module at the end of the transmitting cycle. The transmission buffer and retry circuit may be used to hold the last packet sent and try to send it again if the comparator fails. The packet counters may be used to count both the good and bad packets sent or received by the module.

In one embodiment, when a transmitter of a module determines that it is not receiving data, which may interchangeably with packet bits including control, address, and/or data, the transmitter starts sending data to a remote module and starts counting a number of bits in the data having a predetermined logical value (e.g., a logical value of zero). For the purposes of illustrations, the counter is referred to as a zero counter and the predetermined logical value used is zero. Meanwhile, the transmitter may also store a copy of the packet sent in a transmission buffer in case of need to retransmit. A receiver of the remote module reflects the data back to the transmitter of the transmitting module. The receiver of the remote module also starts counting a number of bits in the received data having a predetermined logical value and stores a copy of the received data in a buffer, such that it may be "canceled" if the packet is bad.

Meanwhile, the transmitting module compares the reflected data against the stored copy of transmitted data to verify whether the previous transmission has been performed successfully. If the comparison is bad, according to one embodiment, the zero counter may be cleared (e.g., zeroed) and the bad transmit counter may be incremented. The data may be retransmitted. If the comparison is good, the value of the zero counter (e.g., a number of the bits having a logical value of zero) may be transmitted to the receiving module and the good transmit counter of the transmitting module may be incremented.

Once the receiving module receives the number of the bits having a logical value of zero, also referred to as a zero count, the receiving module may compare the received zero count with its own zero count. If the comparison is bad (e.g., the zero counts do not match with each other), the received packet may be "canceled" and the bad receive counter may be incremented. Any pending operations of the received packets may be suspended in the anticipation that that the failed packet may be retransmitted. If the comparison is good (e.g., the zero counts are matched with each other), the received data may be forwarded to a proper processing unit for processing the data and the good receive counter may increment.

In one embodiment, there may be a limit to the number of retransmits for a given packet, when reached, resulting in an interrupt to a processor of the transmitting module. Similarly, there may be a limit to the number of failed packets received before an interrupt is sent to the management module.

According to a further embodiment, in order to verify functionality of a module, a bit error generator may be utilized to deliberately generate an error to test whether the transmitting and/or receiving modules are correctly detect and handle such an error. The bit error generator may be utilized as part of a power up self-test of the management module (e.g., SCM module), as well as part of the diagnostics of the remote modules (e.g., the OAFs). It can also be utilized in a run-time diagnostic of the link.

In one embodiment, the bit error generator may be used to verify that the error detection and recovery mechanism is functional. Without this, a feasible alternative is a very complex external device that would only be feasible, at best, in a manufacturing (e.g., one time) test. With the error generator, the error detection and recovery mechanism can be verified as often as desired to assure the customer of the availability of this function.

In one embodiment, an exemplary bit error generator includes, but is not limited to, a control interface to enable error generator, to select a transmitting or receiving direction, and to select which bit or bits of the packets to be altered. In one embodiment, the selected bit or bits may be inverted in a packet going in a selected transmitting or receiving direction. Thereafter, the transmitting and/or the receiving modules may perform certain operations accordingly based on the error packets.

According to one embodiment, there are two error modes, transmitting and receiving modes. The transmitting bit error generator (also referred to as Tx-err) flips a bit as it is leaving the module and the receiving bit error generator (also referred to as Rx-err) flips a bit after it is received. The Rx-err only tests the receive side mechanism. Since the supervisory link mechanism is a transmit only protocol, the Tx-err has the most relevance.

According to one embodiment, when the Tx-err is set, a specified bit in the outgoing packet (address, data or zero-count) is flipped (if a '0' it becomes a '1' and vice-versa). The remote card (such as the OAF) will automatically mirror the data back to the SCM. Since the Tx-zero-counter function happens before the bit is flipped, the receiving function on the remote card will block the use of that errored packet. After the bit is mirrored back to the SCM, the logic compares it to the un-errored Tx data and detects the fault. The logic, at the end of the packet, goes into retry mode (for example, up to certain times before it times out—sending an interrupt message to the SCM). When in retry mode, the Tx-err function is blocked, so it successfully transmits on the retry. Packet counting of Tx and Rx packets with separate counters for good and bad packets result in four (32 bit) counters per supervisory link that are readable (and writeable for initialization and counter rollover purposes) by the SCM processor.

Figure 10:
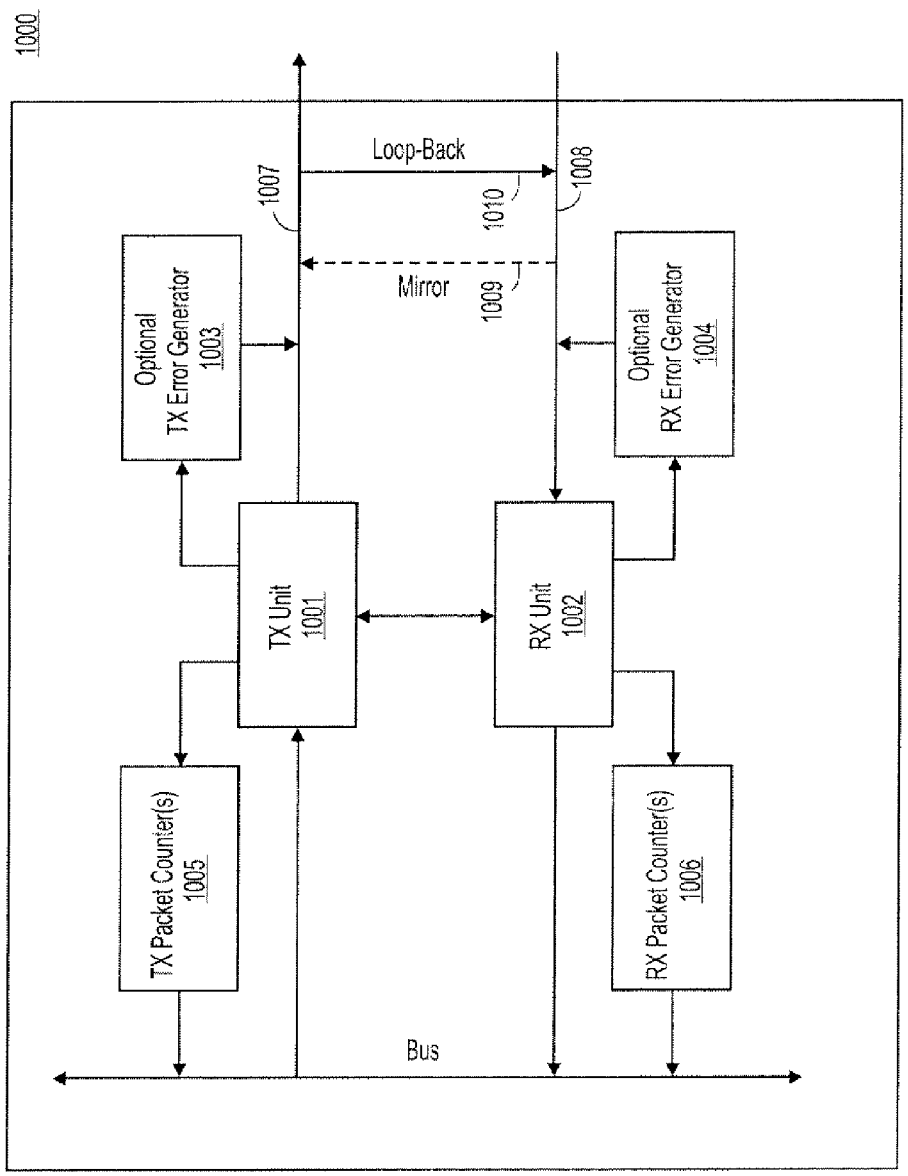
FIG. 10 is a block diagram illustrating an exemplary module of an optical network element according to one embodiment.

FIG. 10 is a block diagram illustrating an exemplary module of an optical network element according to one embodiment. For example, the exemplary module 1000 may be implemented as a management module (e.g., management module 301 of FIG. 3) or a functional module (e.g., functional module 302 of FIG. 3), as either a transmitting module or a receiving module. In one embodiment, the exemplary module 1000, as a transmitting module, transmits a first packet of data to a receiving module (e.g., a remote module). In addition, the exemplary module 1000 may also transmit a first value representing a number of bits of the first packet having a predetermined logical value to the receiving module, where the first value is used by the receiving module to verify integrity of the first packet in order to determine whether the packet has been transmitted successfully.

Referring to FIG. 10, according to one embodiment, the exemplary module 1000 includes, but is not limited to, a transmitting unit 1001, a receiving unit 1002, a transmitting packet counter 1005, a receiving packet counter 1006, an optional transmitting error generator 1003, and an optional receiving error generator 1004. The transmitting unit 1001 may be responsible for transmitting packets to a remote module via a transmitting path 1007. The receiving unit 1002 may be responsible for receiving packets from a remote module via a receiving path 1008. Note that the transmitting path and the receiving path may be implemented within a physical communication link. In a particular embodiment, the communication link may be a half-duplex point-to-point communication link.

In one embodiment, the transmitting packet counter 1005 may be responsible for counting a number of packets that have been transmitted successfully or unsuccessfully. In addition, the transmitting packet counter 1005 may further include a bit counter (also referred to as a zero counter) to count a number of bits in a transmitted packet having a predetermined logical value (e.g., a logical value of zero). Similarly, the receiving packet counter 1006 may be responsible for counting a number of packets have been received successfully or unsuccessfully. In addition, the receiving packet counter 1006 may further include a bit counter (also referred to as a zero counter) to count a number of bits in a received packet having a predetermined logical value (e.g., a logical value of zero). The values in the zero counters may be used by a transmitting module and/or a receiving module to verify integrity of the packet transmitted or received.

According to one embodiment, the optional transmitting error generator 1003 and receiving error generator 1004 may be responsible to deliberately generate one or more error bits within a packet to verify whether a remote module's error detection functionality. In one embodiment, the optional error generators 1003-1004 may be implemented only within a management module of an optical network element.

In one embodiment, before transmitting a test packet to a remote module, the transmitting packet counter 1005 may count a number of bits of the test packet having a predetermined logical value (e.g., a logical value of zero). The transmitting error generator 1003 then alter at least one bit of the test packet, for example, by flipping a bit from logical value of zero to one or vice versa. Meanwhile, the unaltered test packet is stored within the transmitting module, for example, in a temporary buffer. Thereafter, the altered test packet and a value representing a number of bits of the unaltered test packet having the predetermined logical value are transmitted to a remote module. Since the test packet has been altered, the number of bits of the altered test packet having the predetermined logical value would not match the transmitting value representing the number of bits having the predetermined logical value prior to the alteration of the test packet. As a result, the remote module will detect such an error and ignore the received test packet.

The remote module may reflect the altered packet back to the transmitting module, which is also detected by the transmitting module. The transmitting module then may enter a try mode to resend the packet to the remote module. The remote module may further generate an interrupt (for example, by accessing a predetermined memory section of the transmitting module as described above) after several times of retries by the transmitting module. As a result, the error detection and recovery functionality may be verified. The above operations may be performed at runtime without substantial involvement of external testing equipment.

In addition, a packet received from the receiving path 1008 may be mirrored back to the remote transmitting module via a mirror mechanism 1009. Further, the transmitting and receiving functionality of the exemplary module 1000 may be verified within the module via a loop-back mechanism 1010 without invoking a remote module. Other configurations may exist.

Figure 11:
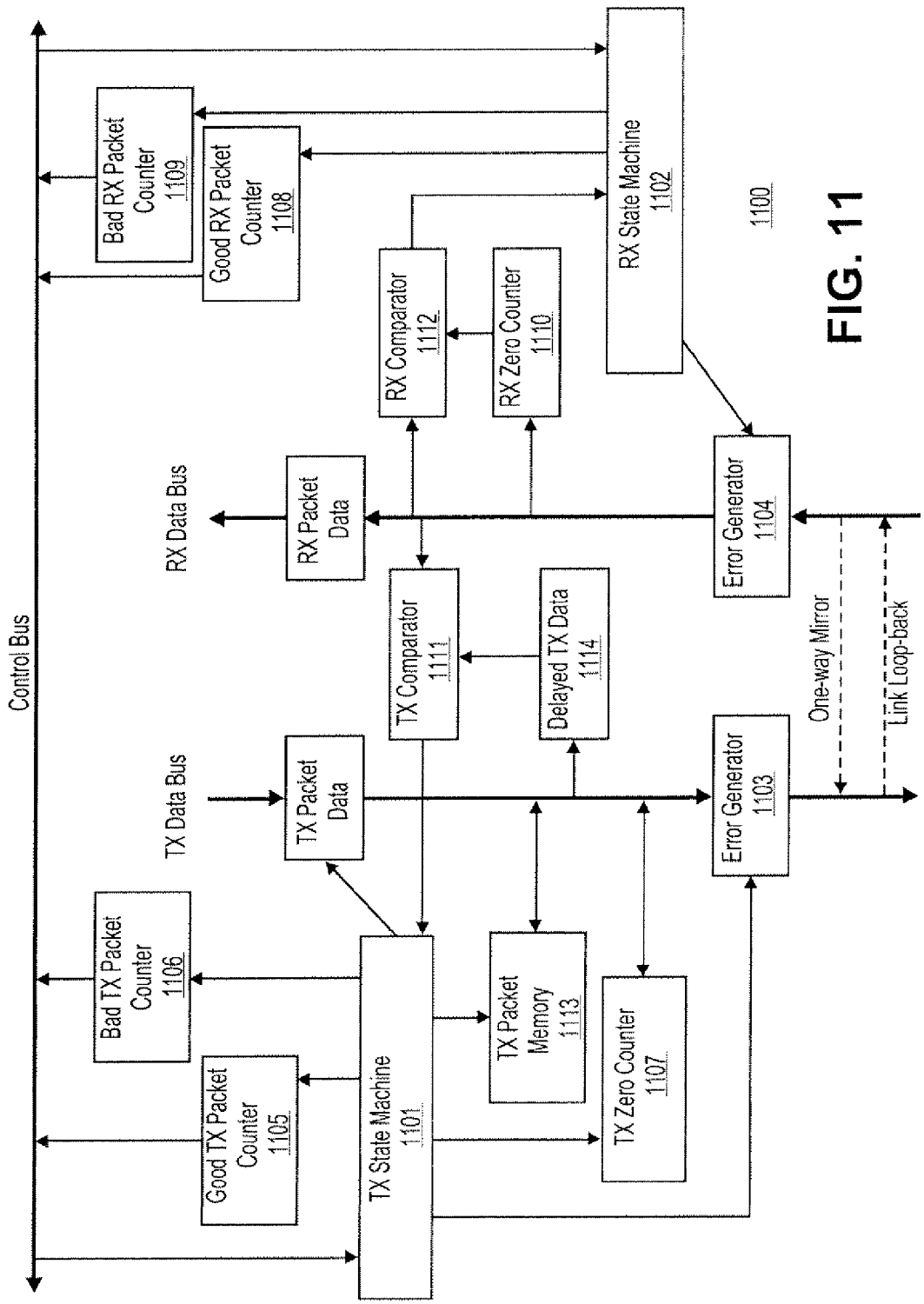
FIG. 11 is a block diagram illustrating an exemplary module of an optical network element according to an alternative embodiment.

FIG. 11 is a block diagram illustrating an exemplary module of an optical network element according to an alternative embodiment. For example, the exemplary module 1100 may be implemented as a part of exemplary module 1000 of FIG. 10. In one embodiment, exemplary module 1100 includes, but is not limited to, a transmitting buffer to maintain a first packet and a first value representing a number of bits of the first packet having a predetermined logical value, an error generator to alter at least one bit of a first packet to form a second packet, transmitting logic to transmit the second packet and the first value to the second module over a communication link, receiving logic to receive a third packet from the second module, the third packet mirroring the second packet, and a comparator to compare the second and third packets to verify functionality of the second module.

Referring to FIG. 11, similar to exemplary module 1000 of FIG. 10, exemplary module 1100 includes a transmitting state machine 1101 and a receiving state machine 1102 for handling transmitting and receiving packets respectively. On the transmitting side, a good transmitting packet counter 1105, a bad transmitting packet counter 1106, and a transmitting zero counter 1107 are implemented, which may be a part of transmitting counter 1005 of FIG. 10. The good transmitting packet counter 1105 may be used to record a number of packets that have been transmitted to a remote module without error. Likewise, the bad transmitting packet counter 1106 may be used to record a number of packets that have been transmitted unsuccessfully. The transmitting zero counter 1107 may be used to count a number of bits of a transmitted packet having a logical value of zero or one.

Similarly, on the receiving side, a good receiving packet counter 1108, a bad receiving packet counter 1109, and a receiving zero counter 1110 are implemented, which may be a part of receiving counter 1006 of FIG. 10. The good receiving packet counter 1108 may be used to record a number of packets that have been received from a remote module without error. Likewise, the bad receiving packet counter 1109 may be used to record a number of packets that have been received with errors. The receiving zero counter 1110 may be used to count a number of bits of a received packet having a logical value of zero or one.

In addition, each of the transmitting and receiving sides includes comparators 1111 and 1112 respectively. On the transmitting side, the transmitting comparator 1111 may be used to compare a stored transmitted packet (e.g., a delayed transmitted packet 1114), which may be stored in a transmitting packet memory 1113, with a packet reflected from the receiving module, which mirrors the transmitted packet, to determine whether the packet has been transmitted to the receiving module successfully. On the receiving side, the receiving comparator 1112 may be used to compare a zero count of the received packet counted by the receiving zero counter 1110 against the one received from the remote module (e.g., a transmitting module) to determine whether the received packet is received successfully.

Furthermore, the exemplary module 1110 may optionally include a transmitting error generator and a receiving error generator to intentionally generate an error packet in order to verify the error detection and recovery functionality of a module (e.g., a local or remote module), as described above. Other configurations may exist.

Figure 12:
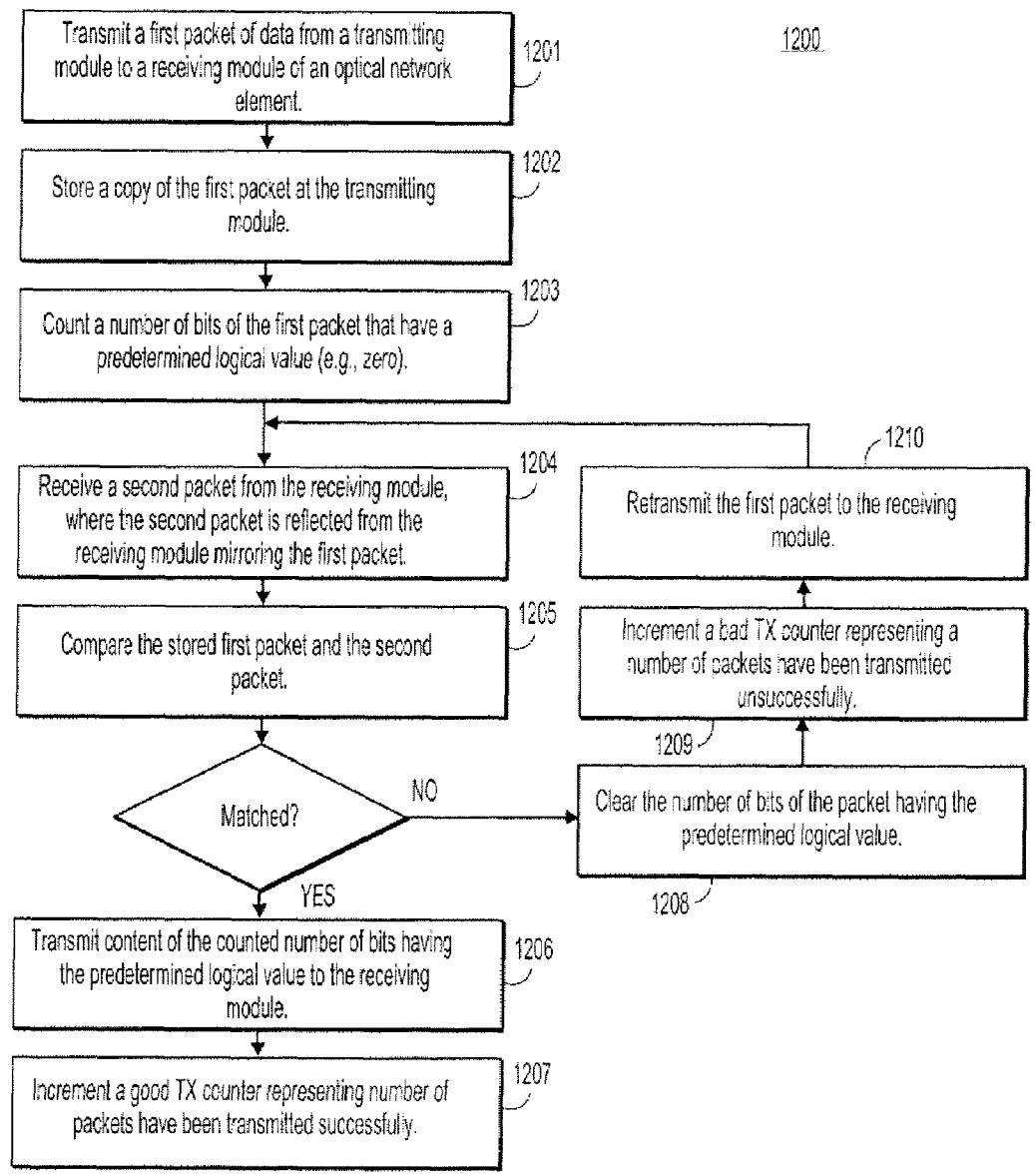
FIG. 12 is a flow diagram illustrating an exemplary process for inter-module communications of an optical network element, according to one embodiment.

FIG. 12 is a flow diagram illustrating an exemplary process for inter-module communications of an optical network element, according to one embodiment. Exemplary process 1200 may be performed by a processing logic that may include hardware (circuitry, dedicated logic, etc.), software (such as is run on a dedicated machine), or a combination of both. For example, exemplary process 1200 may be performed by a management module. In one embodiment, exemplary process 1200 includes, but is not limited to, transmitting from a transmitting module of the optical network element a first packet of data to a receiving module of the optical network element, and the transmitting module transmitting a first value representing a number of bits of the first packet having a predetermined logical value to the receiving module, wherein the first value is used by the receiving module to verify an integrity of the first packet in order to determine whether the packet has been transmitted successfully.

Referring to FIG. 12, at block 1201, a transmitting module (e.g., a management module) transmits a first packet of data to a receiving module (e.g., a functional module), for example, over a supervisory communication channel (SCC) as described above. Meanwhile, at block 1202, a copy of the first packet may be stored or maintained within the transmitting module. In addition, at block 1203, the transmitting module may count a number of bits of the first packet having a predetermined logical value (e.g., a logical value of zero) and stores the count value within the transmitting module. At block 1204, a second packet is received from the remote module (e.g., the receiving module), which mirrors the first packet previously sent to the remote module. At block 1205, the transmitting module compares the first packet (stored within the transmitting module) with the second packet to determine whether they are matched. If the first and second packets are matched, at block 1206, the value representing the number of bits having the predetermined logical value may be sent to the remote module, where the remote module may use the value to compare its own value to determine whether the first packet received is a good packet. Thereafter, at block 1207, a good transmitting packet counter may be incremented.

If the first and second packets are not matched at block 1205, the zero counter may be cleared at block 1208. At block 1209, a bad transmitting packet counter may be incremented and the first packet may be retransmitted at block 1210. In one embodiment, the retransmission may be performed until the packet has been transmitted successfully or alternatively, up to a predetermined number of retries. Other operations may also be performed.

Figure 13:
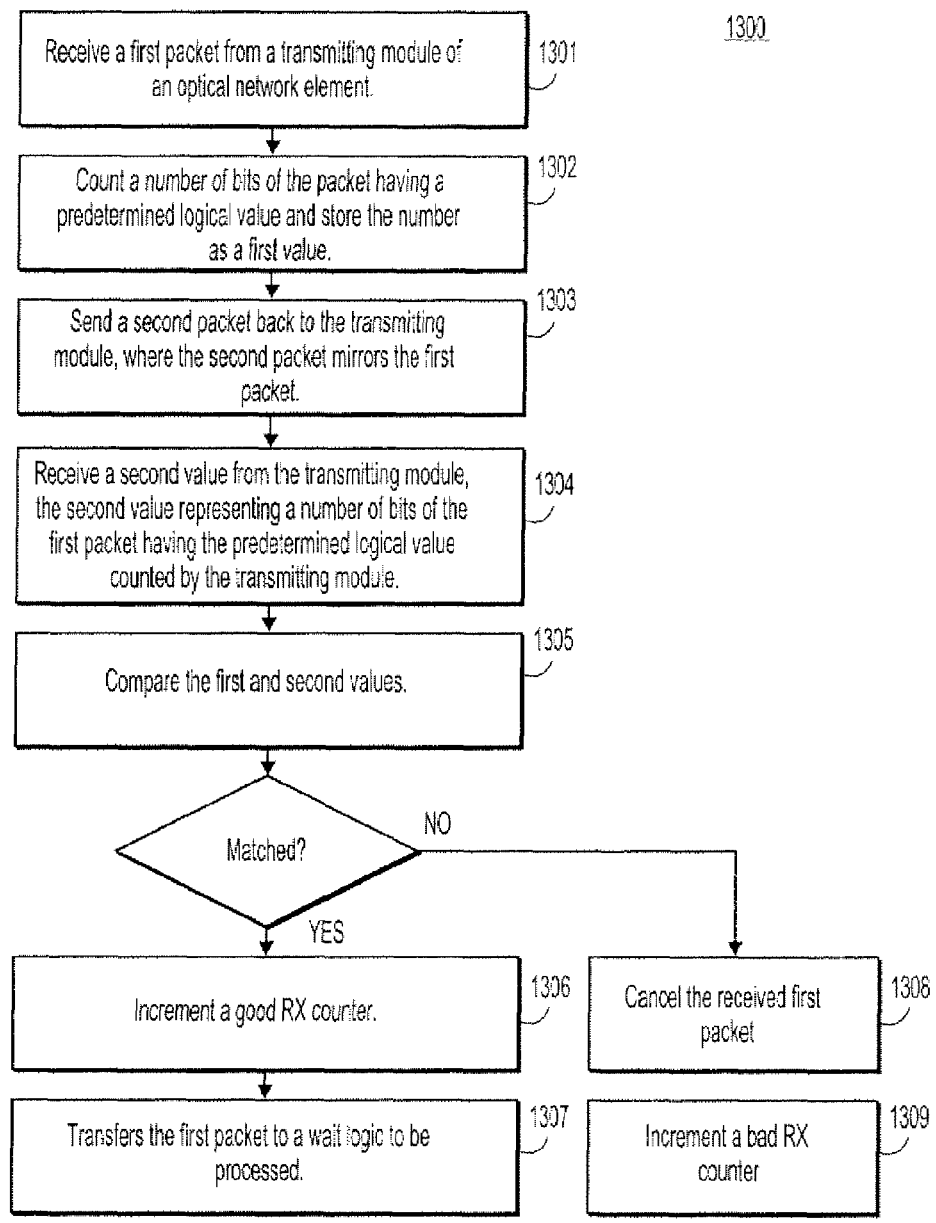
FIG. 13 is a flow diagram illustrating an exemplary process for inter-module communications of an optical network element, according to one embodiment.

FIG. 13 is a flow diagram illustrating an exemplary process for inter-module communications of an optical network element, according to one embodiment. Exemplary process 1300 may be performed by a processing logic that may include hardware (circuitry, dedicated logic, etc.), software (such as is run on a dedicated machine), or a combination of both. For example, exemplary process 1300 may be performed by a functional module. In one embodiment, exemplary process 1300 includes, but is not limited to, receiving at a receiving module a first packet from a transmitting module of the optical network element, counting a number of bits of the first packet having a predetermined logical value to form a first value, and comparing the first value against a second value received from the transmitting module to determine whether the first packet has been received successfully, the second value representing a number of bits of the first packet having the predetermined logical value.

Referring to FIG. 13, at block 1301, a first packet is received from a transmitting module of an optical network element. At block 1302, the receiving module counts a number of bits of the first packet having a predetermined logical value (e.g., a logical value of zero) and stores the value as a first value within the receiving module. At block 1303, the receiving module sends a second packet back to the transmitting module mirroring the first packet. At block 1304, a second value is received from the transmitting module representing a number of bits of the first packet having the predetermined logical value. At block 1305, the receiving module compares the first and second values to determine whether the first packet has been received successfully. If the first and second values are matched, at block 1306, a good receiving packet counter may increment and the received first packet may be processed accordingly at block 1307. If the first and second values are not matched, at block 1308, the first packet may be ignored by the receiving module and the bad receiving packer counter may increment at block 1309. Other operations may also be performed.

Figure 14:
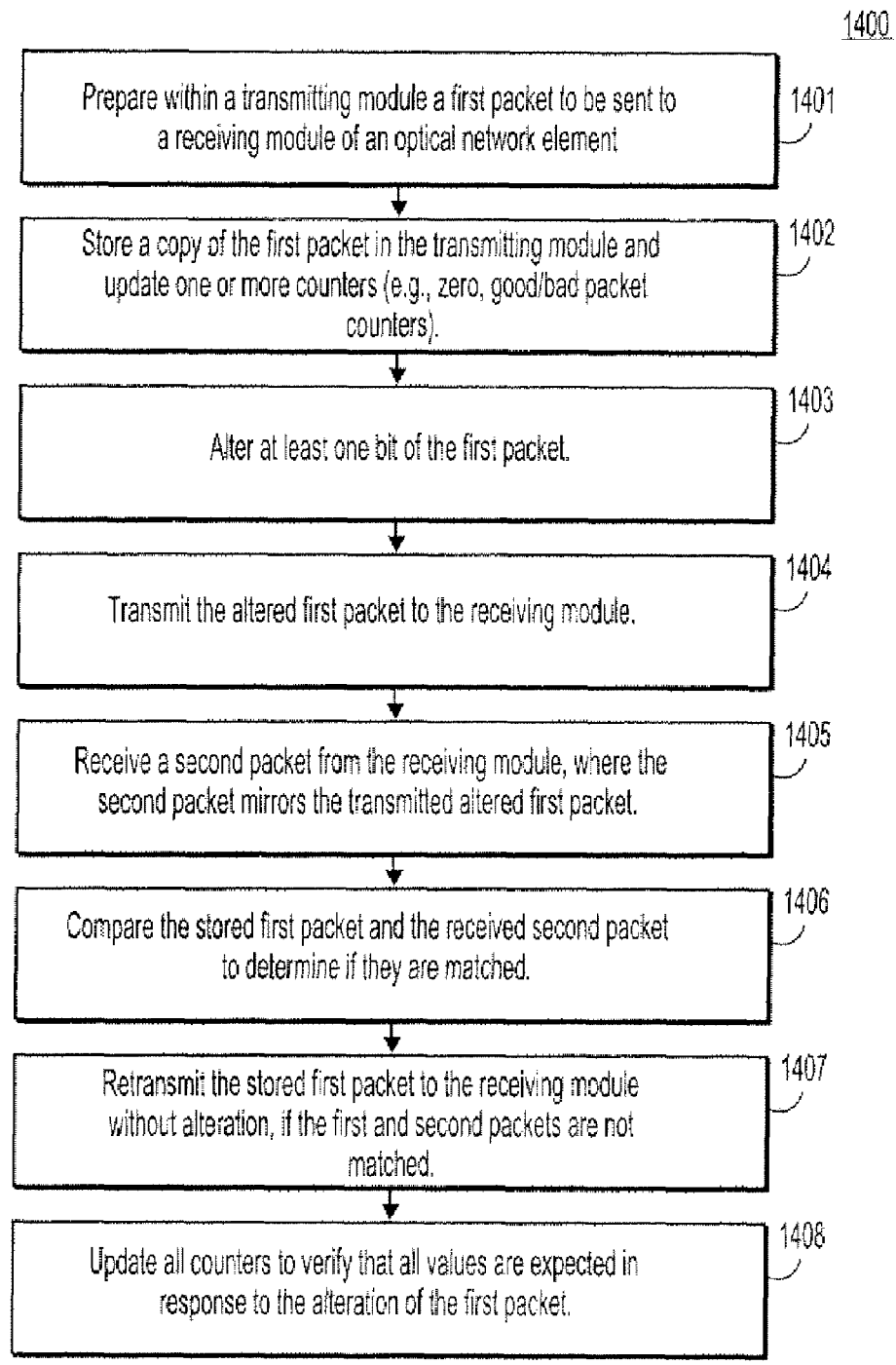
FIG. 14 is a flow diagram illustrating an exemplary process for inter-module communications of an optical network element, according to one embodiment.

FIG. 14 is a flow diagram illustrating an exemplary process for inter-module communications of an optical network element, according to one embodiment. Exemplary process 1400 may be performed by a processing logic that may include hardware (circuitry, dedicated logic, etc.), software (such as is run on a dedicated machine), or a combination of both. In one embodiment, exemplary process 1400 includes, but is not limited to, maintaining within a first module a first packet and a first value representing a number of bits of the first packet having a predetermined logical value, the first module altering at least one bit of a first packet to form a second packet, transmitting the second packet and the first value to a second module over a communication link, receiving a third packet from the second module, the third packet mirroring the second packet, and the first module comparing the second and third packets to verify functionality of the second module.

Referring to FIG. 14, at block 1401, a transmitting module (e.g., a management module) prepares a first packet to be sent to a receiving module of an optical network element. At block 1402, the transmitting module stores a copy of the first packet within the transmitting module. At block 1403, the transmitting module alters at least one bit of the first packet. In one embodiment, at least one bit is flipped from a logical value of zero to one or vice versa. At block 1404, the altered first packet is transmitted to a receiving module as well as a value representing a number of bits if the unaltered first packet having a predetermined logical value. At block 1405, a second packet is received from the receiving module mirroring the transmitted altered first packet. At block 1406, the transmitting module compares the first packet and the second packet. Since the second packet is the altered first packet, the first packet and second packet would not match. As a result, at block 1407, the transmitting module retransmits the first packet (e.g., unaltered packet) to the receiving module and at block 1408, proper counters may be updated accordingly. As a result, the error detection and recovery functionality of the transmitting and/or receiving modules are tested and verified.

Exemplary Memory Configurations

Followings are exemplary memory configurations of a module according to a particular embodiment of the invention. In this example, two FPGAs are used. However, more or less FPGAs may be implemented. Note that the exemplary memory configurations are shown for the illustration purposes only. Other configurations may also be utilized.

| Address: | Read/Write | Function: |
|---|---|---|
| A4000000 | R only | Board presence indicators for slots through FPGA2. |
| A4000010 | R only | Read OEO2 or OPT2. |
| A4000020 | R/W | Enable Control for slots through FPGA2. |
| A4000030 | R/W | Error Generator for slots through FPGA2. |
| A4000040 | R/W | Link-Speed Control for slots through FPGA2. |
| A4000050 | R/W | Loop-back Control for slots through FPGA2. |
| A4000800 to A40008FC | | Packet Counters for slots through FPGA2. |
| A4002000 | R only | Board presence indicators for slots through FPGA1. |
| A4002010 | R only | Read OEO1 or OPT1. |
| A4002020 | R/W | Enable Control for slots through FPGA1. |
| A4002030 | R/W | Error Generator for slots through FPGA1. |
| A4002040 | R/W | Link-Speed Control slots through FPGA1. |
| A4002050 | R/W | Loop-back Control for slots through FPGA1. |
| A4002090 | R/W | SCM-to-SCM Arbiter control & status. |
| A4002800 to A40028FC | | Packet Counters for slots through FPGA1. |
| A4001000 | R/W | Interrupt Mask for Status Writes (Register A400100C) |
| A4001004 | R/W | Interrupt Mask for Read-Reply Writes (Register A4001010) |
| A4001008 | R/W | Interrupt Mask for Interrupt Writes (Register A4001014) |
| A400100C | R only | Indicates status of Status memory for each slot. |
| A4001010 | R only | Indicates status of Read-Reply memory for each slot. |
| A4001014 | R only | Indicates status of Interrupt memory for each slot. |
| A4001018 | R/W | Control bits and CPU Interrupt Mask (Register A400101C) |
| A400101C | Mixed | SCM Slot indicator, CPU Interrupts (0:7) active low. |
| A4004000 to A4005FFC | | Status Memory Sections. |
| A4008000 to A4009FFC | | Read-Reply Memory Sections. |
| A400C000 to A400DFFC | | Interrupt Memory Sections. |
| A5000000 to A53FFFFC | | Direct write access to Slots. |

FPGA Functionality:

Write accesses of remote cards can be considered 'Direct', in that every register is address mapped and (other than potentially board specific implementation exceptions) no indirect addressing or other additional steps is needed other than certain initialization procedures.

Read accesses of remote cards is a two step process. First a write to the remote card indicating starting address and number of (32 bit) words desired. Next Read the Read-Reply memory block for that slot, after the Last-Word indicator has gone to a '1' (for that slot).

Ports are default 'Off', a write to a register can enable them on an individual basis.

A change in status of a port will result in an interrupt with the Interrupt word placed at "C0" in the Interrupt memory for that slot. Port status includes 'Board Present'.

A remote card can also generate an interrupt by sending interrupt word(s) to the Interrupt memory for that slot.

The Remote card Status can either be requested or sent periodically. Each slot has its own Status memory section on the SCM.

The Link between a port on the SCM and the FPGA on the Remote Module is a half duplex connection in order to support the Error Detection, Generator And Recovery (EDGAR) mechanism.

Board Presence Indicators

Address: A4002000 Read only

Data (31 downto 0): Board presence indicators for slots through FPGA1.

'1' indicates board is present in the specified slot.

FPGA1 Bit Map in the Optical Shelf:
Bit '0'=WSM8 slot
Bit '1'=WSM9 slot
Bit '2'=WSM10 slot
Bit '3'=Master SCM
Bit '4'=Fan Controller
Bit '5'=Slave SCM
Bit '6 to 31'=undefined FPGA1 Bit Map in the OEO Shelf:
Bit '0'=NTR1 slot
Bit '1'=NTR2 slot
Bit '2'=NTR3 slot
Bit '3'=NTR4 slot
Bit '4'=NTR5 slot
Bit '5'=NTR6 slot
Bit '6'=NTR7 slot
Bit '7'=NTR8 slot
Bit '8'=Master SCM
Bit '9'=Fan Controller
Bit '10'=Slave SCM
Bit '11 to 31 =undefined Address: A4000000 Read only Data (31 downto 0): Board presence indicators for slots through FPGA2.

'1'indicates board is present in the specified slot.

FPGA2 Bit Map in the Optical Shelf:
Bit '0'=OPM slot.
Bit '1'=OAF1 slot
Bit '2'=OAF2 slot
Bit '3'=OAF3 slot
Bit '4'=OAF4 slot Bit '5'=OAF5 slot
Bit '6'=OAF6 slot
Bit '7'=OAF7 slot
Bit '8'=OAF8 slot
Bit '9'=WSM1 slot
Bit '10'=WSM2 slot
Bit '11'=WSM3 slot
Bit '12'=WSM4 slot
Bit '13'=WSM5 slot
Bit '14'=WSM6 slot
Bit '15'=WSM7 slot
Bit '16 to 31'=undefined FPGA2 Bit Map in the OEO Shelf:
Bit '0'=ESM1 slot.
Bit '1'=ESM2 slot
Bit '2'=DTR1 slot
Bit '3'=DTR2 slot
Bit '4'=DTR3 slot
Bit '5'=DTR4 slot
Bit '6'=DTR5 slot
Bit '7'=DTR6 slot
Bit '8'=DTR7 slot
Bit '9'=DTR8 slot
Bit '10 to 31'=undefined FPGA Type Indicator
Address: A4002010 Read only
Data (31 downto 0):
  Will read "OEO1" in ASCII if the FPGA is configured for the OEO shelf.
    OEO1=(4f, 45, 4f, 31) in ASCII
  Will read "OPT1" in ASCII if the FPGA is configured for the Optical shelf.
    OPT1=(4f, 50, 54, 31) in ASCII
Address: A4000010 Read only
Data (31 downto 0):
  Will read "OEO2" in ASCII if the FPGA is configured for the OEO shelf.
    OEO2=(4f, 45, 4f, 32) in ASCII
  Will read "OPT2" in ASCII if the FPGA is configured for the Optical shelf.
    OPT2=(4f, 50, 54, 32) in ASCII Link Enable Control
Address: A4002020 Read and Writeable
Data (31 downto 0): Enable Control for slots through FPGA1.
  Default=off
  '1' enables the output pins for the link to the specified slot.
  See FPGA1 Bit map for the Optical and OEO shelves above.
Address: A4000020 Read and Writeable
Data (31 downto 0): Enable Control for slots through FPGA2.
  Default=off
  '1' enables the output pins for the link to the specified slot.
  See FPGA2 Bit map for the Optical and OEO shelves above.

Error Generator Control
Address: A4002030 Read and Writeable
Data (6 downto 0): Error Count position—determines where in the packet a bit is inverted. This is for slots through FPGA1. Default='0'
Data (7): Transmit or Receive—determines whether the error will be inserted into a packet on the TX or RX side of the port.
  '1'=TX. This is for slots through FPGA1. Default='0' (RX)
Data (31 downto 8): Error Control for slots through FPGA1.
  Default=off
  '1' enables the Error function for the link to the specified slot.
  See FPGA1 Bit map for the Optical and OEO shelves above
Address: A4000030 Read and Writeable
Data (6 downto 0): Error Count position—determines where in the packet a bit is inverted. This is for slots through FPGA2. Default='0'
Data (7): Transmit or Receive—determines whether the error will be inserted into a packet on the TX or RX side of the port.
  '1'=TX. This is for slots through FPGA2. Default='0' (RX)
Data (31 downto 8): Error Control for slots through FPGA2.
  Default=off '1' enables the Error function for the link to the specified slot.
  See FPGA2 Bit map for the Optical and OEO shelves above Link Speed Control
Address: A4002040 Read and Writeable
Data (31 downto 0): Link-Speed Control for slots through FPGA1.
  Default=Slow (CPLD speed)
  '1' sets the link speed to High (FPGA speed) for the slot.
  See FPGA1 Bit map for the Optical and OEO shelves above.
Address: A4000040 Read and Writeable
Data (31 downto 0): Link-Speed Control for slots through FPGA2.
  Default=Slow (CPLD speed)
  '1' sets the link speed to High (FPGA speed) for the slot.
  See FPGA2 Bit map for the Optical and OEO shelves above.

Loop-back Control
Address: A4002050 Read and Writeable
Data (31 downto 0): Loop-back Control for slots through FPGA1.
  Default=Not in Loop-back
  '1' sets the link in loop-back mode (before leaving SCM).
  See FPGA1 Bit map for the Optical and OEO shelves above.
Address: A4000050 Read and Writeable
Data (31 downto 0): Loop-back Control for slots through FPGA2.
  Default=Not in Loop-back
  '1' sets the link in loop-back mode (before leaving SCM).
  See FPGA2 Bit map for the Optical and OEO shelves above.

Packet Counters
Address: A4002800 to A40028FC Packet Counters for slots through FPGA1.
  A40002800: Slot '0', Rx OK
  A40002804: Slot '0', Rx Bad
  A40002808: Slot '0', Tx OK
  A4000280C: Slot '0', Tx Bad
  A40002810: Slot '1', Rx OK
  A40002814: Slot '1', Rx Bad
  A40002818: Slot '1', Tx OK
  A4000281C: Slot '1', Tx Bad
  A40002820: Slot '2', Rx OK
  A40002824: Slot '2', Rx Bad
  A40002828: Slot '2', Tx OK
  A4000282C: Slot '2', Tx Bad Continue pattern for slots through FPGA1.
Each counter is 32 bits long.
Address: A4000800 to A40008FC Packet Counters for slots through FPGA2.
  A40000800: Slot '0', Rx OK
  A40000804: Slot '0', Rx Bad
  A40000808: Slot '0', Tx OK
  A4000080C: Slot '0', Tx Bad
  A40000810: Slot '1', Rx OK
  A40000814: Slot '1', Rx Bad
  A40000818: Slot '1', Tx OK
  A4000081C: Slot '1', Tx Bad
  A40000820: Slot '2', Rx OK
  A40000824: Slot '2', Rx Bad
  A40000828: Slot '2', Tx OK
  A4000082C: Slot '2', Tx Bad
  Continue pattern for slots through FPGA2.
  Each counter is 32 bits long.

When the port is in loopback mode, all errors are counted as Transmit errors.

Interrupt Enable for status writes:
Address: a4001000:—Read and Writeable
Data (31 downto 0): Default value=x "facebead"
  Mask for Register bits (31:0) at address a400100c.
  '1' enables, '0' blocks resultant interrupt to CPU.

Interrupt Enable for Read-Reply writes:
Address: a4001004:—Read and Writeable
Data (31 downto 0): Default value=x "badd10de"
  Mask for Register bits (31:0) at address a4001010.
  '1' enables, '0' blocks resultant interrupt to CPU.

Interrupt Enable for Interrupt writes:
Address: a4001008:—Read and Writeable
Data (31 downto 0): Default value=x"01234567"
  Mask for Register bits (31:0) at address a4001014.
  '1' enables, '0' blocks resultant interrupt to CPU.

Indicator of 'Status' Writes by Remote Modules:
Address: a400100c:—Read Only
Data (31 downto 0):
Indicates status of status memory for each slot.
'1'=Received a 'Last-Word' from the Remote module for that slot into the Status memory.
If a single word is being sent from the remote module then 'Last-Word' will be active for that word. If multiple words are being sent from the remote module then 'Last-Word' will be active only on the last-word to be sent in that group.
'0'=Status memory section for the slot has never been written to by a remote module (since last reset) OR the Status memory section was written to by the SCM processor since the last time a 'Last-Word' was written to it.

Memory Status Bit Map in the Optical Shelf:
Bit '0'=OPM slot.
Bit '1'=OAF1 slot
Bit '2'=OAF2 slot
Bit '3'=OAF3 slot
Bit '4'=OAF4 slot
Bit '5'=OAF5 slot
Bit '6'=OAF6 slot
Bit '7'=OAF7 slot
Bit '8'=OAF8 slot
Bit '9'=WSM1 slot
Bit '10'=WSM2 slot
Bit '11'=WSM3 slot
Bit '12'=WSM4 slot
Bit '13'=WSM5 slot
Bit '14'=WSM6 slot
Bit '15'=WSM7 slot
Bit '16'=WSM8 slot
Bit '17'=WSM9 slot
Bit '18'=WSM10 slot
Bit '19'=Master SCM
Bit '20'=Fan Controller
Bit '21'=Slave SCM
Bit '22 to 31'=undefined Memory Status Bit Map in the OEO Shelf:
Bit '0'=ESM1 slot.
Bit '1'=ESM2 slot
Bit '2'=DTR1 slot
Bit '3'=DTR2 slot
Bit '4'=DTR3 slot
Bit '5'=DTR4 slot
Bit '6'=DTR5 slot
Bit '7'=DTR6 slot
Bit '8'=DTR7 slot
Bit '9'=DTR8 slot
Bit '10 to 15'=undefined
Bit '16'=NTR1 slot
Bit '17'=NTR2 slot
Bit '18'=NTR3 slot
Bit '19'=NTR4 slot
Bit '20'=NTR5 slot
Bit '21'=NTR6 slot
Bit '22'=NTR7 slot
Bit '23'=NTR8 slot
Bit '24'=Master SCM
Bit '25'=Fan Controller
Bit '26'=Slave SCM
Bit '27 to 31=undefined Indicator of 'Read-Reply' Writes by Remote Modules:
Address: a4001010::—Read Only
Data (31 downto 0):
Indicates status of Read-Reply memory for each slot.
The definition of the bits is the same as for the Status memory sections. The slots are associated with specific bits in the same manner as well.

Indicator of 'Interrupt' Writes by Remote Modules:
Address: a4001014::—Read Only
Data (31 downto 0):
Indicates status of Interrupt memory for each slot. Can also result from a write originating at the Link Port indicating a change in the status of the link.
The definition of the bits is the same as for the Status memory sections. The slots are associated with specific bits in the same manner as well.

Memories associated with Slots:
There are three memory sections associated with each slot. Each section is 256 Bytes in size and limited to 32 bit accesses. The Memories are organized by type with the slot organization identical in each memory. The three types are STATUS, READ-REPLY and INTERRUPT.
The SCM can read and write to all of these memory sections.
The remote cards are limited to writes and only to the memory sections associated with the slot the remote card is in.

Hardware Notes Relating to the Memory Sections:
  Decode:
    Status RAM: Address bit 15=0, bit 14=1.
    Read-Reply RAM: Address bit 15=1, bit 14=0.
    Interrupt RAM: Address bit 15=1, bit 14=1.

Decode per slot is based on address bits 12:8.
Address bit 12=0 indicates slots connected through FPGA2, bit 12=1 indicates FPGA1.
Maximum of 16 slots through a single FPGA (1,2).
Decode of slot (address 12:8) is the same for each type of memory.
Slots are numbered from Left to Right. OAF1, 2 . . .

Applications of the Different Memory Sections:
The Remote card will write to the Status section either when the SCM has written a Send Status command to it or (if implemented) periodically based on a counter on the remote card.
The Remote card will write to the Read-Reply section when the SCM has written a Read-Request command to it containing the starting address offset and the number of 32 bit words to be returned.
The Remote card will write to the Interrupt section when an interrupt condition has occurred on the Remote card.

Status Memory:

In the Optical Shelf: Base addresses of 256 byte sections.
A4004000=Status Memory section for OPM slot.
A4004100=Status Memory section for OAF1 slot
A4004200=Status Memory section for OAF2 slot
A4004300=Status Memory section for OAF3 slot
A4004400=Status Memory section for OAF4 slot
A4004500=Status Memory section for OAF5 slot
A4004600=Status Memory section for OAF6 slot
A4004700=Status Memory section for OAF7 slot
A4004800=Status Memory section for OAF8 slot
A4004900=Status Memory section for WSM1 slot
A4004A00=Status Memory section for WSM2 slot
A4004B00=Status Memory section for WSM3 slot
A4004C00=Status Memory section for WSM4 slot
A4004D00=Status Memory section for WSM5 slot
A4004E00=Status Memory section for WSM6 slot
A4004F00=Status Memory section for WSM7 slot
A4005000=Status Memory section for WSM8 slot
A4005100=Status Memory section for WSM9 slot
A4005200=Status Memory section for WSM10 slot
A4005300=Status Memory section for Master SCM
A4005400=Status Memory section for Fan Controller
A4005500=Status Memory section for Slave SCM
A4005600=unused
A4005700=unused
A4005800=unused
A4005900=unused
A4005A00=unused
A4005B00=unused
A4005C00=unused
A4005D00=unused
A4005E00=unused
A4005F00=unused Status Memory (Continued):

In the OEO Shelf: Base addresses of 256 byte sections.
A4004000=Status Memory section for ESM1 slot.
A4004100=Status Memory section for ESM2 slot
A4004200=Status Memory section for DTR1 slot
A4004300=Status Memory section for DTR2 slot
A4004400=Status Memory section for DTR3 slot
A4004500=Status Memory section for DTR4 slot
A4004600=Status Memory section for DTR5 slot
A4004700=Status Memory section for DTR6 slot
A4004800=Status Memory section for DTR7 slot
A4004900=Status Memory section for DTR8 slot
A4004A00=unused
A4004B00=unused
A4004C00=unused
A4004D00=unused
A4004E00=unused
A4004F00=unused
A4005000=Status Memory section for NTR1 slot
A4005100=Status Memory section for NTR2 slot
A4005200=Status Memory section for NTR3 slot
A4005300=Status Memory section for NTR4 slot
A4005400=Status Memory section for NTR5 slot
A4005500=Status Memory section for NTR6 slot
A4005600=Status Memory section for NTR7 slot
A4005700=Status Memory section for NTR8 slot
A4005800=Status Memory section for Master SCM
A4005900=Status Memory section for Fan Controller
A4005A00=Status Memory section for Slave SCM
A4005B00=unused
A4005C00=unused
A4005D00=unused
A4005E00=unused
A4005F00=unused Read-Reply Memory:

In the Optical Shelf: Base Addresses of 256 Byte Sections.
A4008000=Read-Reply Memory section for OPM slot.
A4008100=Read-Reply Memory section for OAF1 slot
A4008200=Read-Reply Memory section for OAF2 slot
A4008300=Read-Reply Memory section for OAF3 slot
A4008400=Read-Reply Memory section for OAF4 slot
A4008500=Read-Reply Memory section for OAF5 slot
A4008600=Read-Reply Memory section for OAF6 slot
A4008700=Read-Reply Memory section for OAF7 slot
A4008800=Read-Reply Memory section for OAF8 slot
A4008900=Read-Reply Memory section for WSM1 slot
A4008A00=Read-Reply Memory section for WSM2 slot
A4008B00=Read-Reply Memory section for WSM3 slot
A4008C00=Read-Reply Memory section for WSM4 slot
A4008D00=Read-Reply Memory section for WSM5 slot
A4008E00=Read-Reply Memory section for WSM6 slot
A4008F00=Read-Reply Memory section for WSM7 slot
A4009000=Read-Reply Memory section for WSM8 slot
A4009100=Read-Reply Memory section for WSM9 slot
A4009200=Read-Reply Memory section for WSM10 slot
A4009300=Read-Reply Memory section for Master SCM
A4009400=Read-Reply Memory section for Fan Controller
A4009500=Read-Reply Memory section for Slave SCM
A4009600=unused
A4009700=unused
A4009800=unused
A4009900=unused
A4009A00=unused
A4009B00=unused
A4009C00=unused
A4009D00=unused
A4009E00=unused
A4009F00=unused Read-Reply Memory (Continued):

In the OEO Shelf: Base Addresses of 256 Byte Sections.
A4008000=Read-Reply Memory section for ESM1 slot.
A4008100=Read-Reply Memory section for ESM2 slot
A4008200=Read-Reply Memory section for DTR1 slot
A4008300=Read-Reply Memory section for DTR2 slot
A4008400=Read-Reply Memory section for DTR3 slot
A4008500=Read-Reply Memory section for DTR4 slot
A4008600=Read-Reply Memory section for DTR5 slot A4008700=Read-Reply Memory section for DTR6 slot
A4008800=Read-Reply Memory section for DTR7 slot
A4008900=Read-Reply Memory section for DTR8 slot
A4008A00=unused
A4008B00=unused
A4008C00=unused
A4008D00=unused
A4008E00=unused
A4008F00=unused
A4009000=Read-Reply Memory section for NTR1 slot
A4009100=Read-Reply Memory section for NTR2 slot
A4009200=Read-Reply Memory section for NTR3 slot
A4009300=Read-Reply Memory section for NTR4 slot
A4009400=Read-Reply Memory section for NTR5 slot
A4009500=Read-Reply Memory section for NTR6 slot
A4009600=Read-Reply Memory section for NTR7 slot
A4009700=Read-Reply Memory section for NTR8 slot
A4009800=Read-Reply Memory section for Master SCM
A4009900=Read-Reply Memory section for Fan Controller
A4009A00=Read-Reply Memory section for Slave SCM
A4009B00=unused
A4009C00=unused
A4009D00=unused
A4009E00=unused
A4009F00=unused Interrupt Memory:

In the Optical Shelf: Base Addresses of 256 Byte Sections.
A400C000=Interrupt Memory section for OPM slot.
A400C100=Interrupt Memory section for OAF1 slot
A400C200=Interrupt Memory section for OAF2 slot
A400C300=Interrupt Memory section for OAF3 slot
A400C400=Interrupt Memory section for OAF4 slot
A400C500=Interrupt Memory section for OAF5 slot
A400C600=Interrupt Memory section for OAF6 slot
A400C700=Interrupt Memory section for OAF7 slot
A400C800=Interrupt Memory section for OAF8 slot
A400C900=Interrupt Memory section for WSM1 slot
A400CA00=Interrupt Memory section for WSM2 slot
A400CB00=Interrupt Memory section for WSM3 slot
A400CC00=Interrupt Memory section for WSM4 slot
A400CD00=Interrupt Memory section for WSM5 slot
A400CE00=Interrupt Memory section for WSM6 slot
A400CF00=Interrupt Memory section for WSM7 slot
A400D000=Interrupt Memory section for WSM8 slot
A400D100=Interrupt Memory section for WSM9 slot
A400D200=Interrupt Memory section for WSM10 slot
A400D300=Interrupt Memory section for Master SCM
A400D400=Interrupt Memory section for Fan Controller
A400D500=Interrupt Memory section for Slave SCM
A400D600=unused
A400D700=unused
A400D800=unused
A400D900=unused
A400DA00=unused
A400DB00=unused
A400DC00=unused
A400DD00=unused
A400DE00=unused
A400DDF00=unused Interrupt Memory (Continued):

In the OEO Shelf: Base Addresses of 256 Byte Sections.
A400C000=Interrupt Memory section for ESM1 slot.
A400C100=Interrupt Memory section for ESM2 slot
A400C200=Interrupt Memory section for DTR1 slot
A400C300=Interrupt Memory section for DTR2 slot
A400C400=Interrupt Memory section for DTR3 slot
A400C500=Interrupt Memory section for DTR4 slot
A400C600=Interrupt Memory section for DTR5 slot
A400C700=Interrupt Memory section for DTR6 slot
A400C800=Interrupt Memory section for DTR7 slot
A400C900=Interrupt Memory section for DTR8 slot
A400CA00=unused
A400CB00=unused
A400CC00=unused
A400CD00=unused
A400CE00=unused
A400CF00=unused
A400D000=Interrupt Memory section for NTR1 slot
A400D100=Interrupt Memory section for NTR2 slot
A400D200=Interrupt Memory section for NTR3 slot
A400D300=Interrupt Memory section for NTR4 slot
A400D400=Interrupt Memory section for NTR5 slot
A400D500=Interrupt Memory section for NTR6 slot
A400D600=Interrupt Memory section for NTR7 slot
A400D700=Interrupt Memory section for NTR8 slot
A400D800=Interrupt Memory section for Master SCM
A400D900=Interrupt Memory section for Fan Controller
A400DA00=Interrupt Memory section for Slave SCM
A400DB00=unused
A400DC00=unused
A400DD00=unused
A400DE00=unused
A400DF00=unused Direct Slot Access (Write Only):

In the Optical Shelf: Base Addresses of 128K Byte Slots.
A5000000=OPM slot.
A5020000=OAF1 slot
A5040000=OAF2 slot
A5060000=OAF3 slot
A5080000=OAF4 slot
A50A0000=OAF5 slot
A50C0000=OAF6 slot
A50E0000=OAF7 slot
A5100000=OAF8 slot
A5120000=WSM1 slot
A5140000=WSM2 slot
A5160000=WSM3 slot
A5180000=WSM4 slot
A51A0000=WSM5 slot
A51C0000=WSM6 slot
A51E0000=WSM7 slot
A5200000=WSM8 slot
A5220000=WSM9 slot
A5240000=WSM10 slot
A5260000=Master SCM
A5280000=Fan Controller
A52A0000=Slave SCM
A52C0000=unused
A52E0000=unused
A5300000=unused
A5320000=unused
A5340000=unused
A5360000=unused
A5380000=unused
A53A0000=unused
A53C0000=unused
A53E0000=unused NOTE: Addresses A5000000 to A51E0000 are through FPGA2

NOTE: Addresses A5200000 to A53E0000 are through FPGA1

Direct Slot Access (Write Only) (Continued):
In the OEO Shelf: Base addresses of 128K byte Slots.
A5000000=ESM1 slot.
A5020000=ESM2 slot
A5040000=DTR1 slot
A5060000=DTR2 slot
A5080000=DTR3 slot
A50A0000=DTR4 slot
A50C0000=DTR5 slot
A50E0000=DTR6 slot
A5100000=DTR7 slot
A5120000=DTR8 slot
A5140000=unused
A5160000=unused
A5180000=unused
A51A0000=unused
A51C0000=unused
A51E0000=unused
A5200000=NTR1 slot
A5220000=NTR2 slot
A5240000=NTR3 slot
A5260000=NTR4 slot
A5280000=NTR5 slot
A52A0000=NTR6 slot
A52C0000=NTR7 slot
A52E0000=NTR8 slot
A5300000=Master SCM
A5320000=Fan Controller
A5340000=Slave SCM
A5360000=unused
A5380000=unused
A53A0000=unused
A53C0000=unused
A53E0000=unused NOTE: Addresses A5000000 to A51E0000 are through FPGA2

NOTE: Addresses A5200000 to A53E0000 are through FPGA1

Thus, inter-module communications of an optical network element have been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An optical network element, comprising:
a plurality of functional modules arranged in a plurality of shelves; and
a plurality of management modules for coordinating the functional modules corresponding to each of the plurality of shelves respectively,
wherein each of the management modules includes a memory having a plurality of memory segments, each memory segment corresponding to each of the functional modules of a respective shelf to allow each of the functional modules of the respective shelf to communicate with the management module by accessing a respective memory segment,
wherein a specific memory segment of a memory of a management module of a particular shelf is specifically allocated and assigned to a specific functional module on the same shelf to allow the specific functional module to directly read and/or write data from/to the specific memory segment of the memory of the management module, wherein the specific memory segment is also accessed by the management module to exchange data between the management module and the specific functional module.

2. The optical network element of claim 1, wherein each of the memory segment of a management module comprises a first memory section and a second memory section, wherein the first memory section is used by a functional module to communicate with the management module, and wherein the second memory section is used by the management module to communicate with the functional module.

3. The optical network element of claim 2, wherein the first memory section is a write-only memory section by the functional module, and wherein the second memory section is a write-only memory section by the management module.

4. The optical network element of claim 2, wherein at least a portion of registers and a memory of the functional module is mapped to a portion of the second memory section.

5. The optical network element of claim 2, wherein the management module sends a request for retrieving data from the functional module via the second memory section, and wherein in response to the request, the functional module sends the requested data to the management module via the first memory section.

6. The optical network element of claim 5, wherein the management module sends the request to the functional module by writing the request to a predetermined address of the second memory section, and wherein the request includes an address of the first memory section to which the functional module sends the requested data.

7. The optical network element of claim 6, wherein the functional module, in response to the request received through the second memory section, writes the requested data to the address of the first section specified by the request.

8. The optical network element of claim 5, wherein the first memory section comprises a first memory segment to receive the requested data from the functional module.

9. The optical network element of claim 8, wherein the first memory section further comprises a second memory segment to receive status from the functional module periodically.

10. The optical network element of claim 9, wherein the status is received from the functional module in response to a memory write by the management module to a predetermined address of the second memory section.

11. The optical network element of claim 9, wherein the first memory section further comprises a third memory segment to receive an interrupt request from the functional module, wherein a memory write to the third memory segment by the functional module causes an interrupt generated within the management module.

12. The optical network element of claim 1, wherein each management module comprises a plurality of module presence interfaces corresponding to the plurality of functional modules managed by the respective management module of a shelf.

13. The optical network element of claim 12, wherein when a functional module is inserted into a slot, a presence interface associated with the slot detects the insertion of the functional module and generates an interrupt within the management module indicating the insertion of the functional module.

14. The optical network element of claim 13, wherein in response to the interrupt, the management module provides power to a supervisory section of the functional module and to retrieve configuration information of the functional module from the powered-up supervisory section.

15. The optical network element of claim 14, wherein in response to the configuration information, the management module accesses a register of the functional module via the second memory section to cause a remainder of the functional module to be powered up by a power supply of a back plane.

16. The optical network element of claim 1, wherein each of the management modules is communicatively coupled to each of the functional modules associated with the respective management module via a half duplex point-to-point communication link.

17. A method for operating an optical network element, the method comprising:
    arranging a plurality of functional unit inserted in a plurality of slots managed by a management unit of the optical network element; and
    configuring a memory of the management unit into a plurality of memory segments, each of the plurality of memory segments corresponding to each of the slots and exclusively accessed by a functional unit inserted in the respective slot in order to communicate with the management unit, wherein a specific memory segment of a memory of a management unit of specifically allocated and assigned to a specific functional unit to allow the specific functional unit to directly read and/or write data from/to the specific memory segment of the memory of the management unit, wherein the specific memory segment is also accessed by the management unit to exchange data between the management unit and the specific functional unit.

18. The method of claim 17, further comprising dividing each memory segment into a first memory section and a second memory section, wherein the first memory section is used by a functional module to communicate with the management module, and wherein the second memory section is used by the management module to communicate with the functional module.

19. The method of claim 18, further comprising:
    mapping at least a portion of registers and a memory of the functional module to a portion of the second memory section of the management unit; and
    communicating with the functional unit by accessing the mapped registers and memory of the functional unit.

20. An optical network, comprising: one or more optical network elements coupled to each other, each optical network element including
    a plurality of functional modules arranged in a plurality of shelves,
    a plurality of management modules for coordinating the functional modules corresponding to each of the plurality of shelves respectively, and
    wherein each of the management modules includes a memory having a plurality of memory segments, each memory segment corresponding to each of the functional modules of a respective shelf to allow each of the functional modules of the respective shelf to communicate with the management module by accessing a respective memory segment,
    wherein a specific memory segment of a memory of a management module of a particular shelf is specifically allocated and assigned to a specific functional module on the same shelf to allow the specific functional module to directly read and/or write data from/to the specific memory segment of the memory of the management module, wherein the specific memory segment is also accessed by the management module to exchange data between the management module and the specific functional module.

* * * * *